(12) United States Patent
Nakamura

(10) Patent No.: US 9,826,647 B2
(45) Date of Patent: Nov. 21, 2017

(54) CONNECTING SYSTEM OF MULTI-SECTION HOUSING AND ELECTRONIC DEVICE PROVIDED WITH THAT CONNECTING SYSTEM

(71) Applicant: FUJITSU LIMITED, Kawasaki-shi, Kanagawa (JP)

(72) Inventor: Yutaka Nakamura, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 14/887,526

(22) Filed: Oct. 20, 2015

(65) Prior Publication Data

US 2016/0044803 A1 Feb. 11, 2016

Related U.S. Application Data

(63) Continuation of application No. PCT/JP2013/062656, filed on Apr. 30, 2013.

(51) Int. Cl.
*H05K 5/00* (2006.01)
*G06F 1/16* (2006.01)
(Continued)

(52) U.S. Cl.
CPC .............. *H05K 5/0017* (2013.01); *G06F 1/16* (2013.01); *G06F 1/1641* (2013.01); *G06F 1/1647* (2013.01); *G09F 9/40* (2013.01); *H04M 1/0206* (2013.01); *H04M 1/0212* (2013.01); *H04M 1/0247* (2013.01); *H04M 2250/16* (2013.01)

(58) Field of Classification Search
CPC .......... H04M 1/0206; H04M 2250/16; H04M 1/0212; G06F 1/1641; G06F 1/1647; G06F 1/16; H05K 5/0017
See application file for complete search history.

(56) References Cited

U.S. PATENT DOCUMENTS

2003/0228847 A1* 12/2003 Matsumoto ......... H04M 1/0212
455/90.3
2005/0091431 A1* 4/2005 Olodort .................. G06F 1/162
710/72
(Continued)

FOREIGN PATENT DOCUMENTS

JP 2000-196720 7/2000
JP 2007-335949 12/2007
(Continued)

*Primary Examiner* — Zachary M Pape
*Assistant Examiner* — Douglas Burtner
(74) *Attorney, Agent, or Firm* — Fujitsu Patent Center

(57) ABSTRACT

A connecting system of a multi-section housing provided at one end face of a first and second housing superposed with their display surfaces at the outsides, comprising: a first shaft vertical to superposed surfaces of first and second housing; and a second shaft perpendicular to the first shaft, wherein if a center line of the first shaft is arranged on a line bisecting the end face to the left and right and the center line of the second shaft is arranged on the superposed surfaces of the first and second housing, the first shaft can be used to allow the second housing superposed over the first housing to be rotated by 180 degrees and, in this state, the first housing can be made to rotate by the second shaft by 180 degrees so as to arrange the display surfaces of the first and second housings on the same plane.

7 Claims, 22 Drawing Sheets

(51) Int. Cl.
*H04M 1/02* (2006.01)
*G09F 9/40* (2006.01)

(56) References Cited

U.S. PATENT DOCUMENTS

| | | | | |
|---|---|---|---|---|
| 2005/0094360 | A1* | 5/2005 | Lee | H04M 1/0227 361/679.27 |
| 2005/0125570 | A1* | 6/2005 | Olodort | G06F 1/162 710/15 |
| 2005/0141703 | A1* | 6/2005 | Hickey | H04M 1/0212 379/433.13 |
| 2005/0215296 | A1* | 9/2005 | Fujihara | H04M 1/021 455/575.3 |
| 2005/0283945 | A1* | 12/2005 | Pan | E05D 3/10 16/221 |
| 2006/0059659 | A1* | 3/2006 | Kim | H04M 1/0212 16/330 |
| 2006/0097927 | A1* | 5/2006 | Satoh | H01Q 1/084 343/702 |
| 2006/0293095 | A1* | 12/2006 | Takagi | H04M 1/0212 455/575.3 |
| 2007/0227873 | A1* | 10/2007 | Kawasaki | G06F 1/1613 200/443 |
| 2007/0281666 | A1* | 12/2007 | Yoshida | H04M 1/021 455/411 |
| 2008/0151481 | A1* | 6/2008 | Misawa | G06F 1/1616 361/679.07 |
| 2008/0199002 | A1* | 8/2008 | Kim | H04M 1/0222 379/433.13 |
| 2009/0061961 | A1* | 3/2009 | Ueta | H04M 1/0245 455/575.3 |
| 2009/0221335 | A1* | 9/2009 | Nakazawa | H04M 1/0227 455/575.4 |
| 2009/0223021 | A1* | 9/2009 | Endo | H04M 1/0222 16/371 |
| 2009/0235487 | A1* | 9/2009 | Endo | H04M 1/0222 16/243 |
| 2010/0041439 | A1* | 2/2010 | Bullister | G06F 1/1615 455/566 |
| 2010/0188350 | A1 | 7/2010 | Sawada | |
| 2010/0234073 | A1* | 9/2010 | Kusano | G06F 1/162 455/566 |
| 2011/0310073 | A1* | 12/2011 | Nagata | G06F 3/1423 345/207 |
| 2012/0208603 | A1* | 8/2012 | Sakai | H04M 1/0212 455/566 |
| 2013/0009904 | A1* | 1/2013 | Koda | G06F 1/1641 345/173 |
| 2014/0031095 | A1* | 1/2014 | Herrera | H04M 1/0206 455/575.3 |
| 2014/0306864 | A1* | 10/2014 | Nakamura | G06F 1/1624 345/1.3 |
| 2014/0355216 | A1* | 12/2014 | Kawasaki | H05K 5/00 361/724 |

FOREIGN PATENT DOCUMENTS

| | | |
|---|---|---|
| JP | 2009-71588 | 4/2009 |
| JP | 2010-154149 | 7/2010 |
| JP | 2010-266752 | 11/2010 |
| WO | 2008/117456 | 10/2008 |

\* cited by examiner

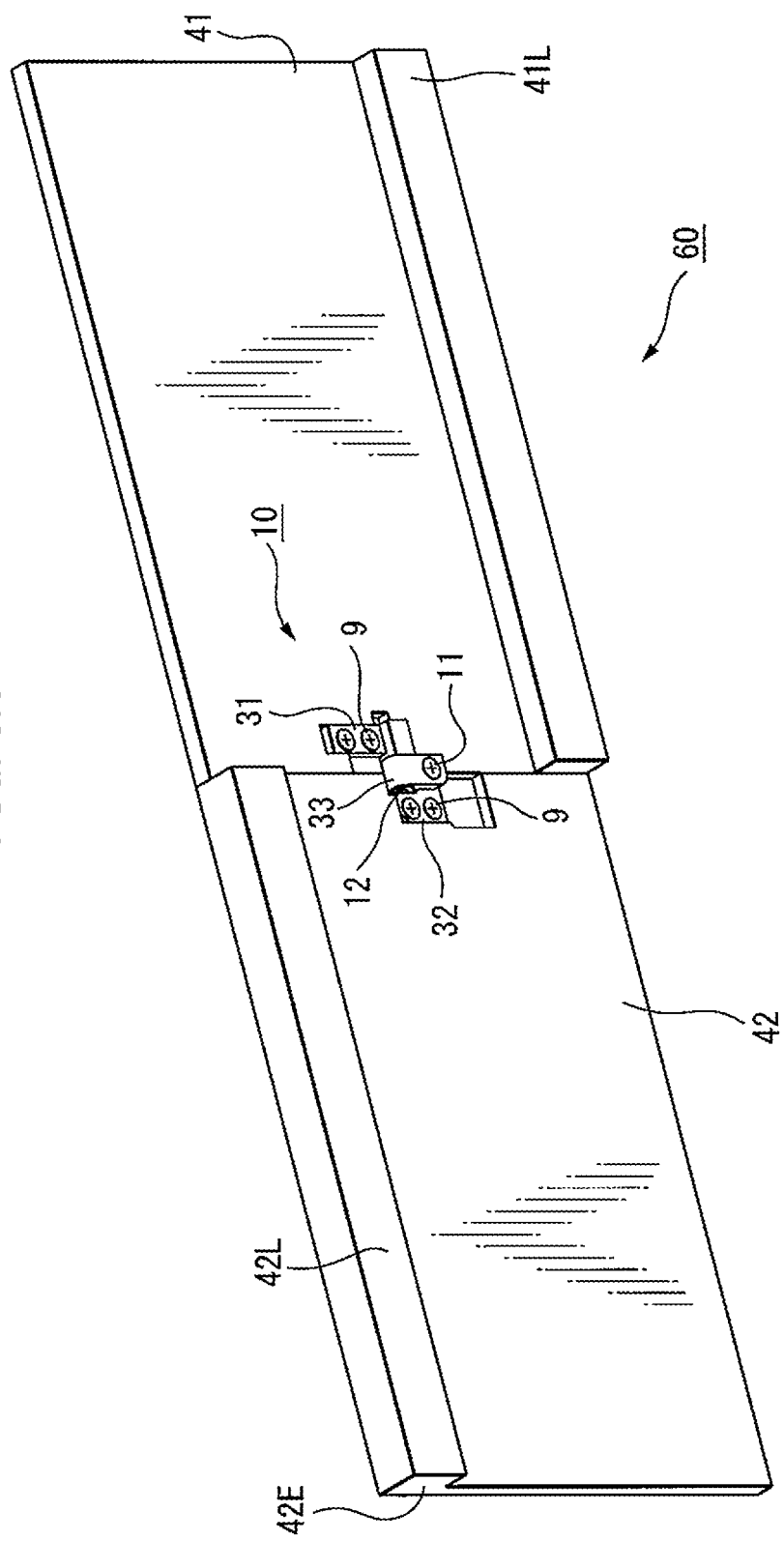

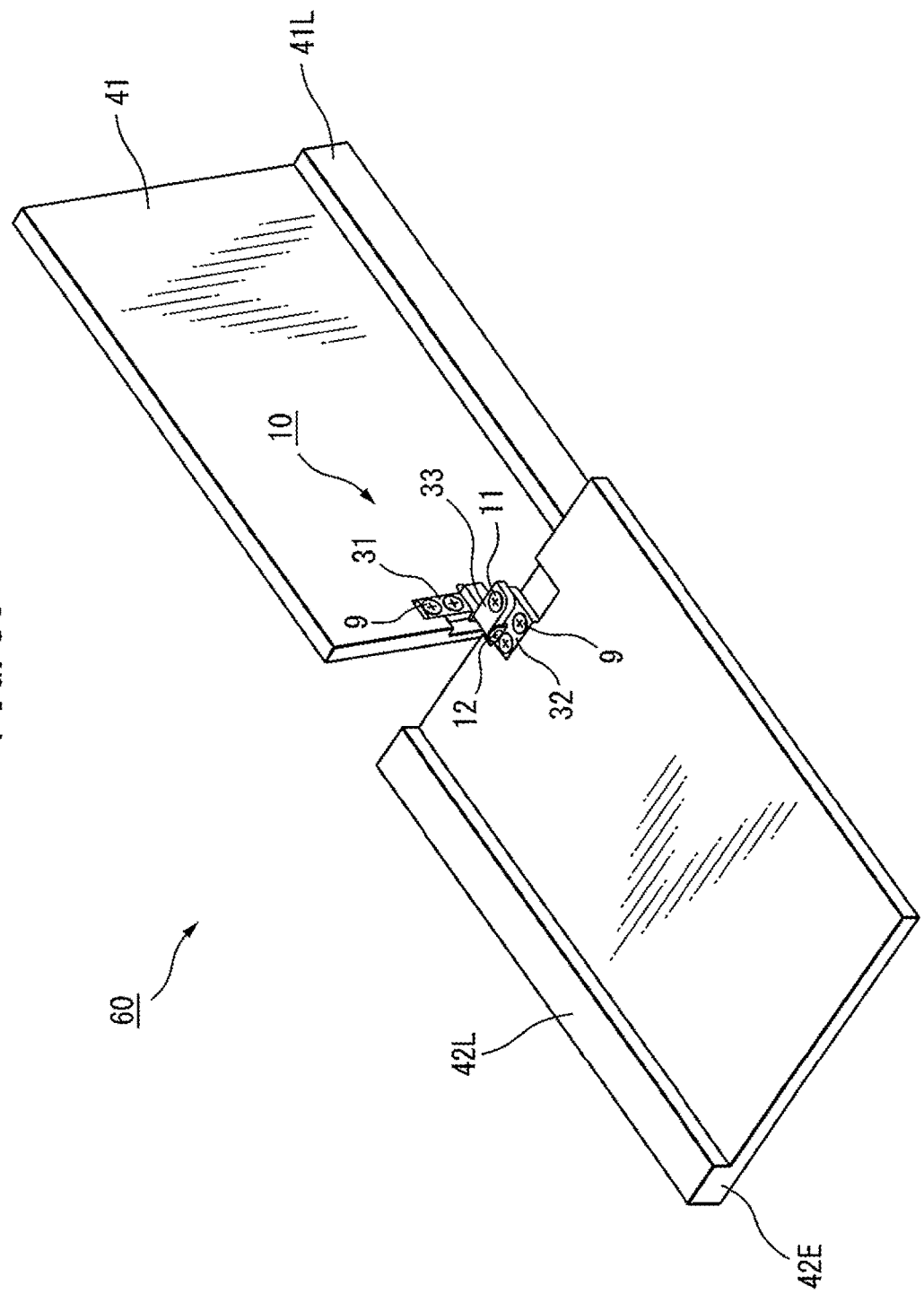

CONNECTING SYSTEM OF MULTI-SECTION HOUSING AND ELECTRONIC DEVICE PROVIDED WITH THAT CONNECTING SYSTEM

CROSS-REFERENCE TO RELATED APPLICATION

This application is a continuation application based upon and claims priority of International Patent Application No. PCT/JP2013/62656, filed on Apr. 30, 2013, the contents being incorporated herein by reference.

FIELD

The present application relates to a connecting system of a multi-section housing and to an electronic device which is provided with that connecting system.

BACKGROUND

In recent years, mobile phones and other data terminals have been made smaller and thinner. Along with this, to improve the portability, operability, and ease of viewing of the display, there are products which enable the display and other moving parts to slide with respect to the keyboard and other fixed parts. FIG. 1A illustrates a data terminal 3 in a state where a moving housing (upper side housing) 2 is superposed over a fixed housing (lower side housing) 1. This data terminal 3, as illustrated in FIG. 1B, is used in a state with the movable housing 2 made to slide with respect to the fixed housing 1. As such a form of a data terminal 3, for example, there are a mobile phone, mobile terminal (tablet computer or other small computer), game machine, etc.

In this regard, in such a data terminal 3, as illustrated in FIG. 1B, when making the movable housing 2 slide with respect to the fixed housing 1, due to the structure of the housing sections, an overlap part L was necessary between the fixed housing 1 and the movable housing 2 in the full open state (full slide state). For this reason, the amount of slide of the movable housing 2 with respect to the fixed housing 1 was only up to two-thirds of the housing length in the slide direction. This structure was fine in the case of making the lower side fixed housing 1 the keyboard, but when also making the lower side fixed housing 1 a display part, due to the overlap part L, it was not possible to obtain a sufficient area for display.

As opposed to this, as illustrated in FIG. 1C, a data terminal 4 of a structure where the movable housing 2 becomes flat (full flat) with respect to the fixed housing 1 at the time of full slide is, for example, disclosed in Japanese Laid-Open Publication No. 2009-71588 and Japanese Laid-Open Publication No. 2010-154149. In Japanese Laid-Open Publication No. 2009-71588, there is a connecting piece which connects the side surfaces of the fixed housing (first housing) and movable housing (second housing). One of two pins at the connecting piece is supported at the movable housing, while the other is slidably engaged with the fixed housing. Further, in Japanese Laid-Open Publication No. 2010-154149, the fixed housing (second housing) and the movable housing (first housing) are connected by a link mechanism. The movable housing is fully slid with respect to the fixed housing to make the display surface fully flat.

When using a mobile terminal for e-mails or Twitter® or other applications, a small size like that of a smart phone is sufficient, but when viewing an electronic magazine or newspaper, large screen size tablets are best suited. Further, it is hard to walk around while holding both a smart phone type mobile phone and a tablet, so there is a need for using a tablet for both purposes.

However, while there have been terminals where two screens have been made single flat screens up to now, there has never been a terminal which realizes the equivalent size as a tablet by connecting a larger number of screens, for example, four screens. Further, even if it had been possible to connect four housing sections to form a large screen data terminal, as illustrated in FIG. 1D, there was the issue of a step difference forming at the screens of the housing sections 5A to 5D divided into four so as to form a data terminal 5. Further, if a step difference arises, the screen becomes harder to view or a touch operation (wipe operation) ends up being obstructed.

SUMMARY

In one aspect, the present application provides a connecting system of a multi-section housing in a data terminal or other electronic device where a large number of housing sections are connected to form a single screen, wherein when the housing sections are connected, the screen of the connected housing sections becomes fully flat. Further, it provides an electronic device when the housing sections of a multi-section housing are connected, the screen of the connected housing sections becomes fully flat. Further, the connecting system is simple in structure and easy to manufacture.

According to one aspect of the present application, there is provided a connecting system of a multi-section housing which is provided at a center part of single end faces of first and second housing sections of the same dimensions which are superposed with display surfaces at the outsides, the connecting system of a multi-section housing provided with a first shaft which is provided in a direction vertical to superposed surfaces of the first and second housing sections and a second shaft which is provided in a direction perpendicular to the first shaft, arranging the first shaft so that its center line is on a line bisecting the end faces to the left and right and arranging the second shaft so that its center line is on the superposed surfaces of the first and second housing sections to thereby make the second housing section which is superposed below the first housing section rotate by the first shaft by 180 degrees and in this state make the first housing section rotate by the second shaft by 180 degrees, whereby the display surfaces of the first and second housing sections can be formed on the same plane. The first shaft and the second shaft can be provided at twisted positions. Further, there is provided a connecting system of a multi-section housing which is provided with, in addition to a connecting system which connects the first and second housing sections, a connecting system which connects third and fourth housing sections which are arranged below the first and second housing section and which is provided with second connecting devices which connect the end faces of the first and fourth housing sections and the second and third housing sections and which enable all of the display surfaces of the four superposed housing sections to be formed on the same plane.

Further, according to another aspect of the present application, there is provided an electronic device which is provided with a multi-section housing comprised of first to fourth four housing sections superposed in that order and with the first and second housing sections and third and fourth housing sections with their display surfaces at the outside, which electronic device which is provided with a multi-section housing is provided with a connecting system of a multi-section housing which is provided with connecting devices which are arranged at end faces of the first and second housing sections and end faces of the third and fourth housing sections, which allow the second housing section to be rotated with respect to the first housing section and the third housing section to be rotated with respect to the fourth housing section by first shafts in the horizontal direction by 180 degrees, then enable the second housing section to be rotated with respect to the first housing section and the third housing section to be rotated with respect to the fourth housing section by second shafts in the vertical direction by 180 degrees and which are provided with first hinges which connect single end faces of the first and fourth housing sections which are exposed in directions parallel to the second shafts and second hinges which connect end faces of the second and third housing sections which are exposed in directions parallel to the second shafts at the opposite sides to the end faces of the first hinge sides and a control device which is provided at any of the first to fourth housing sections and displays an image of one-quarter of a screen's worth of a single display image synchronized with other images, wherein by using the first shafts of the connecting system of a multi-section housing to make the second and third housing sections be rotated with respect to the first and fourth housing sections in the horizontal direction and, in the finished rotation state, using the first and second hinges to make the first and fourth housing sections and the second and third housing sections be rotated about the second shafts while being opened, the first to fourth housing sections form a single flat surface, and when the single flat surface is formed, the control device is used to display a single image as a whole on the adjoining display screens.

BRIEF DESCRIPTION OF DRAWINGS

FIG. 8A is a perspective view of the state where the first and second housing sections are spread open by the first connecting device of the second aspect which is illustrated in FIG. 7B as seen from the back side of the display surfaces.

FIG. 8C is a perspective view which illustrates the state where the first housing section starts to be rotated about the second shaft of the first connecting device of the second aspect from the state which is illustrated in FIG. 8A.

DESCRIPTION OF EMBODIMENTS

Below, using the attached drawings, embodiments of a connecting system of a multi-section housing and an electronic device which is provided with that connecting system according to the present application will be explained in detail based on detailed examples.

Figure 1A:
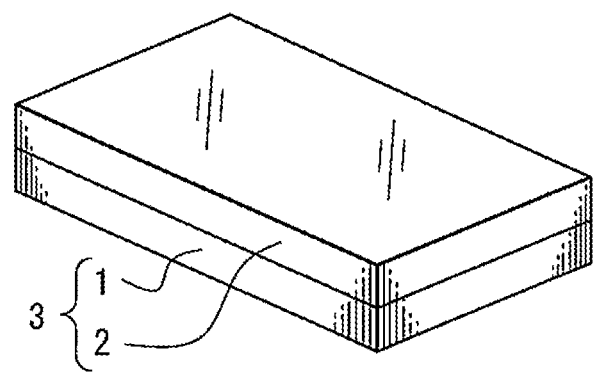
FIG. 1A is a perspective view which illustrates a closed state of a slide type data terminal of the related art.
Figure 1B:
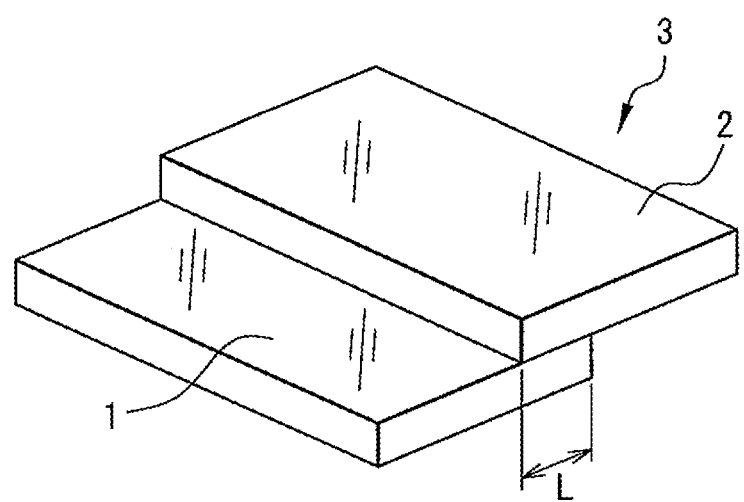
FIG. 1B is a perspective view which illustrates a slide out state of the data terminal which is illustrated in FIG. 1A.
Figure 1C:
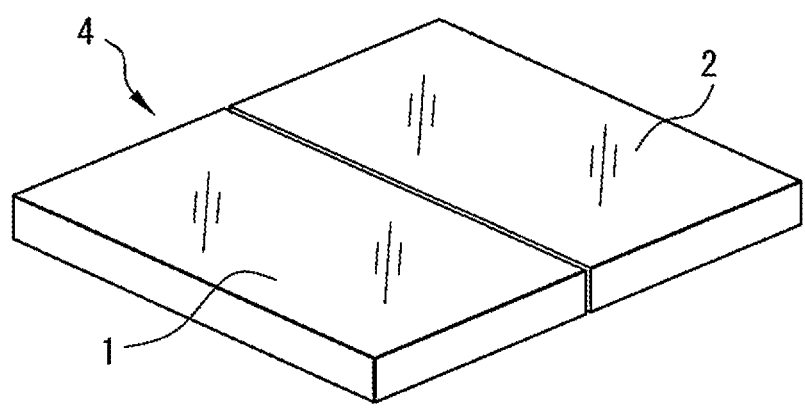
FIG. 1C is a perspective view which illustrates a state where the data terminal which is illustrated in FIG. 1B is further slid out to render the screen a full flat state.
Figure 1D:
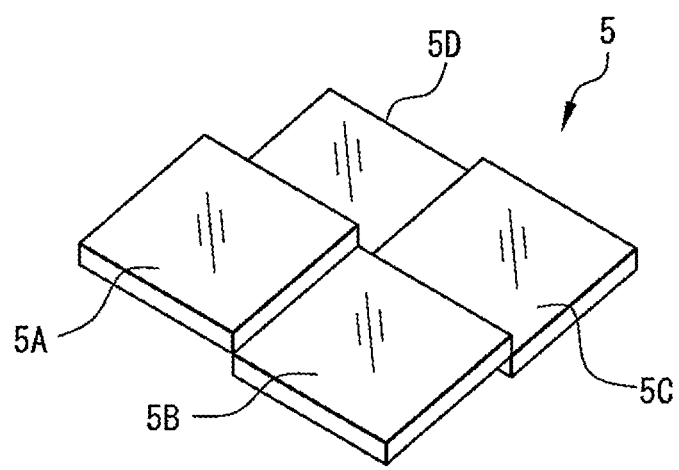
FIG. 1D is a perspective view which illustrates a data terminal of the related art which is provided with a connected screen obtained by connecting four housing sections.
Figure 2A:
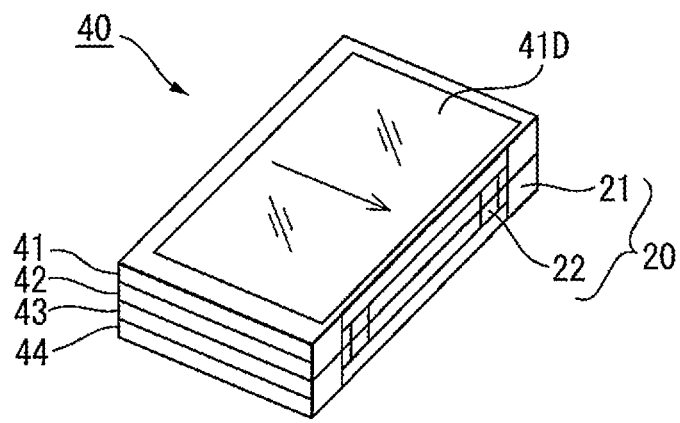
FIG. 2A is a perspective view which illustrates a superposed state of a multi-section housing in one embodiment of an electronic device of the present application which is provided with four housing sections.
Figure 2B:
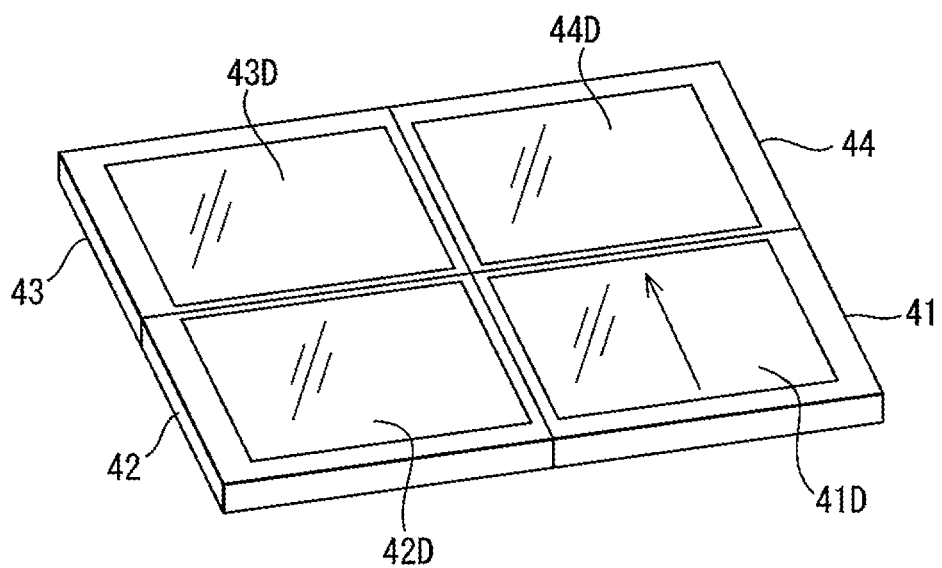
FIG. 2B is a perspective view which illustrates the state where the multi-section housing of the electronic device which is illustrated in FIG. 2A is spread open using a connecting system and the surfaces at which screens are provided are made flat and the screens are made to adjoin each other.

FIG. 2A discloses the closed state of one embodiment of an electronic device 40 which is provided with a housing which is divided into a plurality of separate housing parts (hereafter referred to as a "multi-section housing"), while FIG. 2B illustrates an electronic device 40 in the state opened using the later explained first and second two connecting devices. The electronic device 40 of the present embodiment is comprised of first to fourth four separate housing parts 41 to 44 superposed in that order. The separate housing parts 41 to 44 will hereinafter be referred to as the "housing sections 41 to 44". The first connecting devices are hidden in FIG. 2A and FIG. 2B and cannot be seen, but the second connecting devices 20 comprise first hinges 21 and second hinges 22. The first hinges 21 connect the first and fourth housing sections 41, 44 at single side surfaces, while the second hinges 22 connect the second and third housing sections 42, 43 at the same side surfaces.

The first to fourth four housing sections 41 to 44 have respective display surfaces (also described as "displays" in some cases) 41D to 44D. The displays 41D, 44D of the first and fourth housing sections 41, 44 are exposed to the outside of the electronic device 40 in the state where the first to fourth four housing sections 41 to 44 are superposed. On the other hand, the displays 42D, 43D of the second and third housing sections 42, 43 adjoin each other in the state where the second and third housing sections 42, 43 are superposed. In the state where the first to fourth four housing sections 41 to 44 are opened, the displays 41D to 44D approach each other resulting in a single large screen. If providing any of the first to fourth housing sections 41 to 44 with a control device which displays an image of one-quarter a screen's worth of a single display image synchronized with other screens, it is possible to display a large image on a single large screen.

Among the first to fourth four housing sections 41 to 44, the adjoining first and second housing sections 41, 42 form a pair, while the similarly adjoining third and fourth housing sections 43, 44 form a pair. The first connecting devices of the present embodiment are provided between the end faces of the first and second housing sections 41, 42 and between the end faces of the third and fourth housing sections 43, 44. On the other hand, as explained above, the second connecting devices connect the unpaired first and fourth housing sections 41, 44 and the second and third housing sections 42, 43. The arrows which are displayed on the display 41D of the first housing section 41 are illustrated as illustrated in FIG. 2B if the first to fourth housing sections 41 to 44 are spread open by the first and second connecting devices.

The electronic device 40 of the present application, as illustrated in FIG. 2A and FIG. 2B, enables the realization of a single large display when provided with the first to fourth four housing sections 41 to 44. On the other hand, the electronic device of the present application can be effectively used even when using a first connecting device to spread open the first and second housing sections 41, 42 to form a double size display. Therefore, first, the case where the first and second housing sections 41, 42 are connected by a first connecting device and a display of two times the size is obtained after being spread open will be explained. Further, next, the case where the first to fourth housing sections 41 to 44 are connected by first and second connecting devices and a display of four times the size results after being spread open will be explained.

Figure 3A:
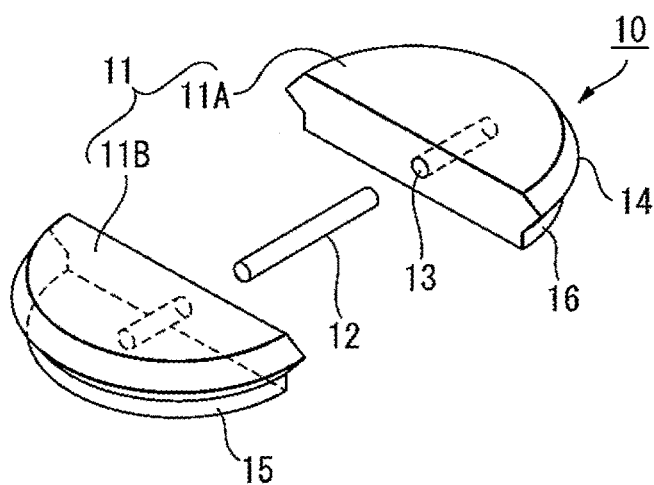
FIG. 3A is an assembled perspective view which illustrates the structure of a first aspect of a first connecting device of the present application which connects first and second housing sections.
Figure 3B:
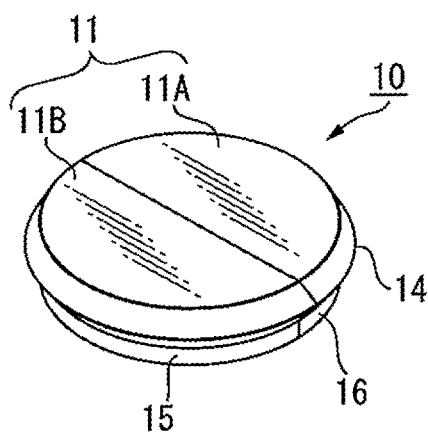
FIG. 3B is a perspective view which illustrates the assembled state of the first connecting device which is illustrated in FIG. 3A
Figure 3C:
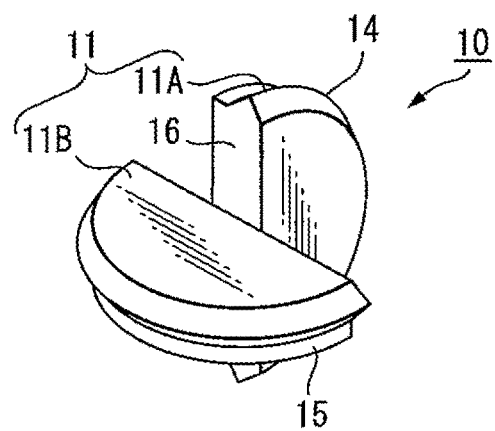
FIG. 3C is a perspective view which illustrates the state where one of the semicircular shafts which form a first shaft which is illustrated in FIG. 3B is rotated with respect to the other by 90 degrees.
Figure 3D:
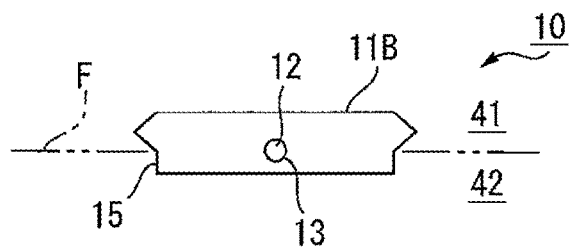
FIG. 3D is a cross-sectional view which illustrates the position of the second shaft which is built into the first aspect of the first connecting device with respect to the superposed surfaces of the first and second housing sections.
Figure 3E:
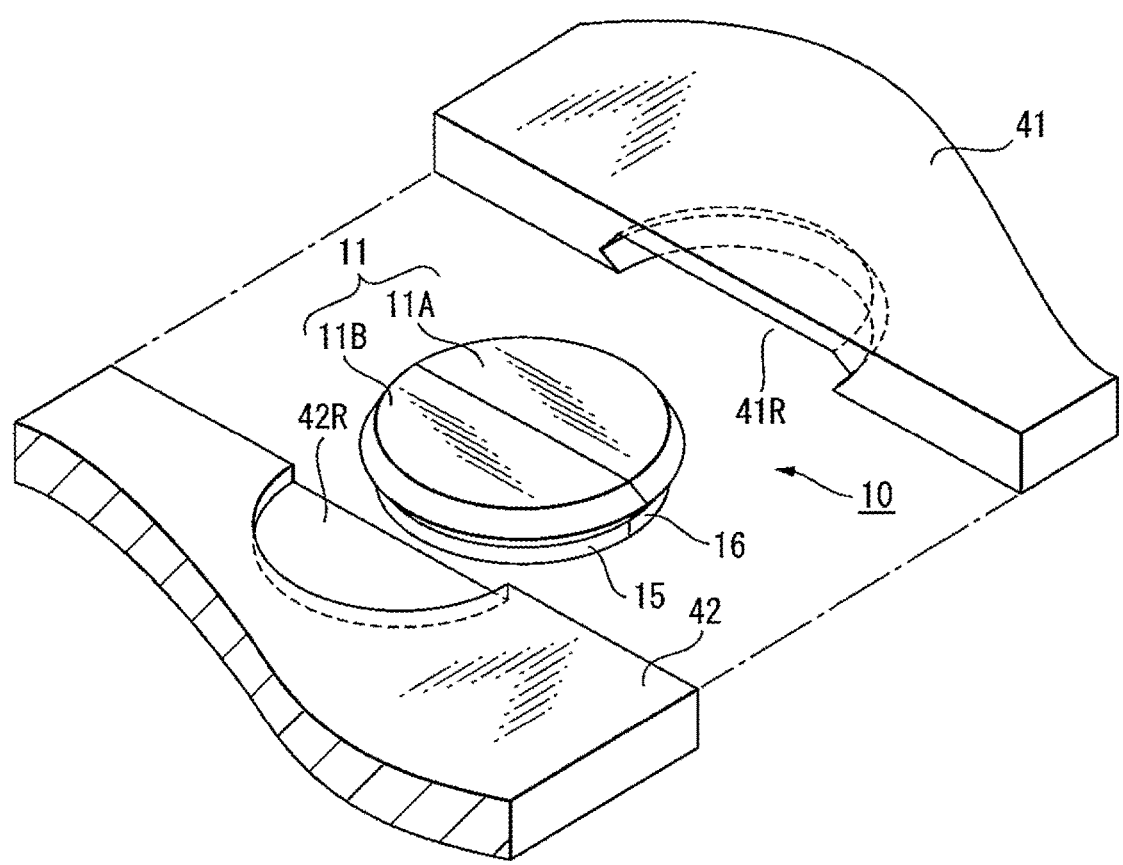
FIG. 3E is an assembled perspective view which illustrates the shapes of the end faces of the first and second housing sections together with the first connecting device when attaching the first connecting device of the first aspect which is illustrated in FIG. 3B to the end faces of the first and second housing sections.
Figure 4A:
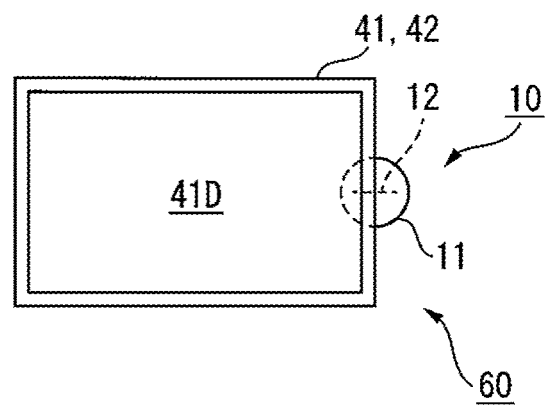
FIG. 4A is a plan view of the first and second housing sections which have the first connecting device of the first aspect of the present application built into them and are superposed with the display surfaces at the outsides.

FIG. 3A to FIG. 3D illustrate the structure and operation of a first aspect of the first connecting device 10 of the present application, while FIG. 3E illustrates the attachment of the first connecting device 10 of the first aspect to the first and second housing sections 41, 42. Further, FIG. 4A to FIG. 4F explain the change from the closed position to spread open position of the first and second housing sections 41, 42 in the case where as illustrated in FIG. 3E the first and second housing sections 41, 42 have the first connecting device 10 attached to them. As illustrated in FIG. 4A, the first connecting device 10 is provided at the center parts of single end faces of the first and second housing sections 41, 42 when the first and second housing sections 41, 42 of the same dimensions are superposed with the displays 41D, 42D at the outside.

As illustrated in FIG. 3A, the first connecting device 10 of the first aspect is provided with a first shaft 11 and a second shaft 12 which is provided in a direction perpendicular to the first shaft. The first shaft 11 is provided in a vertical direction to the superposed surfaces of the first and second housing sections 41, 42. In the first aspect, it forms a columnar shape. The axial line bisects the end faces. The columnar shaped first shaft 11 is divided into two to the left and right. These form a first semicircular shaft 11A and a second semicircular shaft 11B. The bisected surfaces of the first shaft 11 are provided with axial holes 13 which are perpendicular to the bisected surfaces. The axial holes 13 are provided so as to be perpendicular to the axial line of the first shaft 11. Further, the axial holes 13 of the first semicircular shaft 11A and the second semicircular shaft 11B have the second shaft 12 inserted into them. Therefore, the first shaft 11 and the second shaft 12 are perpendicular.

Further, at the parts close to the top surfaces of the first semicircular shaft 11A and the second semicircular shaft 11B, ridges 14 are provided circling the outer circumferential surface of the first shaft 11. In the present embodiment, the first semicircular shaft 11A is attached to the first housing section 41, while the second semicircular shaft 11B is fastened to the second housing section 42. Therefore, the bottom end part of the second semicircular shaft 11B is provided with an attachment projection 15. Further, in the present embodiment, the bottom end part of the first semicircular shaft 11A is also provided with a projection 16 of the same shape as the attachment projection 15, but the projection 16 need not be made the same shape as the attachment projection 15. The bottom end part of the first semicircular shaft 11A need only be shaped formed with an axial hole 13.

FIG. 3B illustrates the state where the first connecting device 10 which is illustrated in FIG. 3A is assembled, while FIG. 3C illustrates the state where the first semicircular shaft 11A which is illustrated in FIG. 3B is rotated with respect to the second semicircular shaft 12A by 90 degrees. The first semicircular shaft 11A can be rotated with respect to the second semicircular shaft 12A by 180 degrees. The first connecting device 10 which is provided with such a structure, as illustrated in FIG. 3E, has an attachment projection 15 which is provided at the bottom end part of the second semicircular shaft 11B fit into an attachment recess part 42R which is provided at the end part of the second housing section 42. At this time, as illustrated in FIG. 3D, the top end part of the attachment projection 15 is positioned at the superposed surface of the second housing section 42 with the first housing section 41 and the center line of the second shaft 12 which is inserted into the axial hole 13 is positioned on the superposed surface F.

On the other hand, the ridge 14 which is provided at the top side of the first semicircular shaft 11A can be fit into a rotary groove 41R which is provided at the bottom end part of the first housing section 41 to be able to rotate. Further, due to the ridges 14 which are provided at the first shaft 11, the first housing section 41 can no longer be pulled out to the top side with respect to the first shaft 11. That is, the ridges 14 are ridges for preventing detachment so that the first housing section 41 no longer detaches from the top side. The first housing section 41 with the rotary groove 41R fit with the first semicircular shaft 11A can rotate about the first shaft 11, that is, up to the second semicircular shaft 11B side, if the first semicircular shaft 11A does not rotate about the second shaft 12 with respect to the second semicircular shaft 12A. Note that, in the present embodiment, to facilitate understanding of the configuration, the diameter of the first shaft 11 is drawn large, but the diameter of the first shaft 11 need only be a size which can hold the second shaft 12 and is not particularly limited.

Due to this configuration, if using the first shaft 11 to make the second housing section 42 which is superposed under the first housing section 41 rotate by 180 degrees and in this state making the first housing section 41 rotate by the second shaft 12 by 180 degrees, the displays 41D, 42D of the first and second housing sections can be formed on the same plane. Note that, the mechanism for preventing the first shaft 11 which had been fit into the rotary groove 41R from detaching in the horizontal direction is not illustrated, but the following such mechanism may be considered. For example, if forming a circumferential groove at the top surface of the columnar shaped first shaft 11 and fitting the ridges 14 into the rotary groove 41R, then positioning the front end part of the pin which is attached from the display surface side of the first housing section 41, the first shaft 11 which is fit into the rotary groove 41R will not detach in the horizontal direction.

Figure 4B:
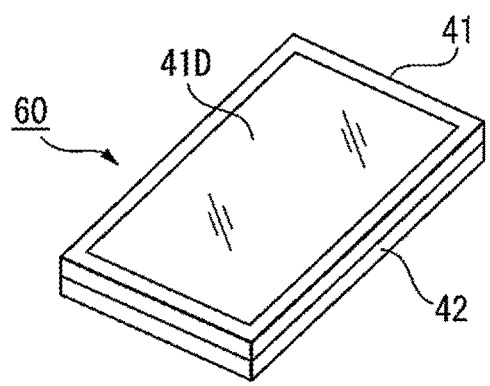
FIG. 4B is a perspective view of the first and second housing sections which are illustrated in FIG. 4A.

Here, the operation of the electronic device 60 which is provided with the first connecting device 10 of the first aspect of the present application and which spreads open the first and second housing sections 41, 42 which are superposed with their displays at the outsides by the first connecting device 10 so as to make the displays adjoin each other will be explained using FIG. 4A to FIG. 4F. FIG. 4A is a plan view which illustrates an electronic device 60 comprised of first and second housing sections 41, 42 superposed, while FIG. 4B is a perspective view of the electronic device 60. Single end faces of the first and second housing sections 41, 42 have the first connecting device 10 provided with a first shaft 11 and second shaft 12 attached to them.

Figure 4C:
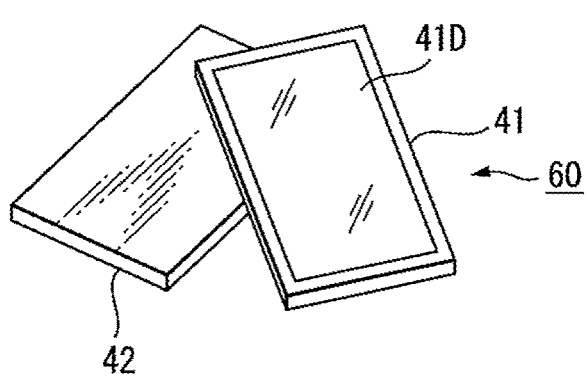
FIG. 4C is a perspective view which illustrates the state where the first housing section starts to be rotated with respect to the second housing section in the horizontal direction by the first shaft of the first connecting device from the state of FIG. 4B.
Figure 4D:
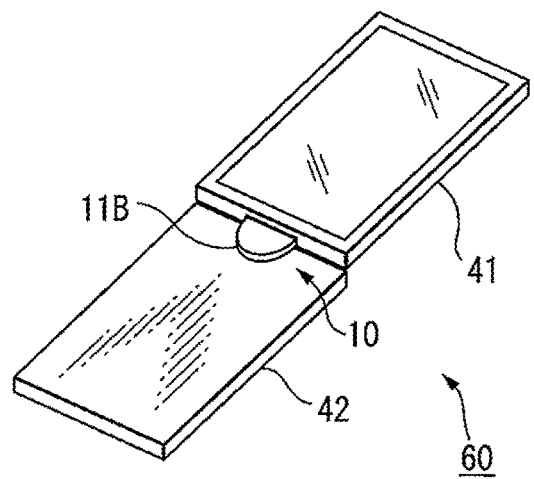
FIG. 4D is a perspective view which illustrates the state where the first housing section is further rotated and is rotated with respect to the second housing section by 180 degrees from state of FIG. 4C.
Figure 4E:
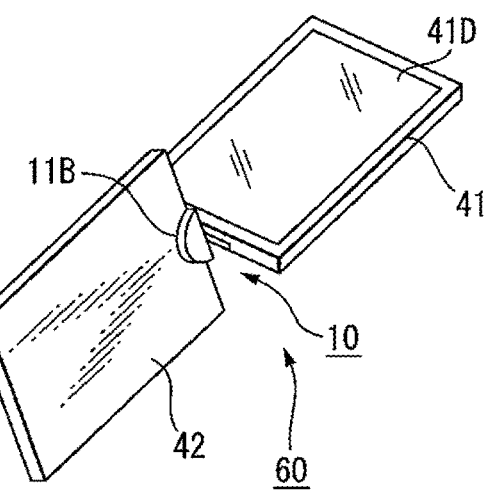
FIG. 4E is a perspective view which illustrates the state where the second housing section starts to be rotated with respect to the first housing section in the vertical direction by the second shaft of the first connecting device from the state of FIG. 4D.
Figure 4F:
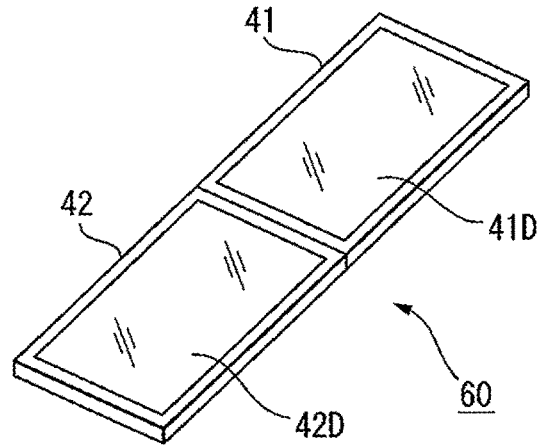
FIG. 4F is a perspective view which illustrates the state where the second housing section is further rotated and is rotated with respect to the first housing section by 180 degrees so that the display surfaces adjoin each other from the state of FIG. 4D.

FIG. 4C illustrates the state where the first shaft 11 of the first connecting device 10 is used to make the first housing section 41 start to be rotated with respect to the second housing section 42 in the horizontal direction from the state which is illustrated in FIG. 4B. If continuing to make the first housing section 41 rotate with respect to the second housing section 42 in the horizontal direction and make the first housing section 41 rotate with respect to the second housing section 42 by 180 degrees, the result becomes the state of FIG. 4D. In this state, the second semicircular shaft 11B is exposed on the second housing section 42 and the first semicircular shaft 11A is in the first housing section 41. Here, as illustrated in FIG. 4E, the second housing section 42 is made to rotate about the second shaft 12 of the first connecting device 10 in the vertical direction. Further, if rotating the second housing section 42 about the second shaft 12 of the first connecting device 10 by 180 degrees, the state becomes the one which is illustrated in FIG. 4F and the display 41D of the first housing section 41 and the display 42D of the second housing section 42 adjoin each other at the same plane. In this embodiment, the first connecting device 10 is provided at the end faces of the short sides of the first and second housing sections 41, 42, but may also be provided at the end faces of the long sides.

Figure 5A:
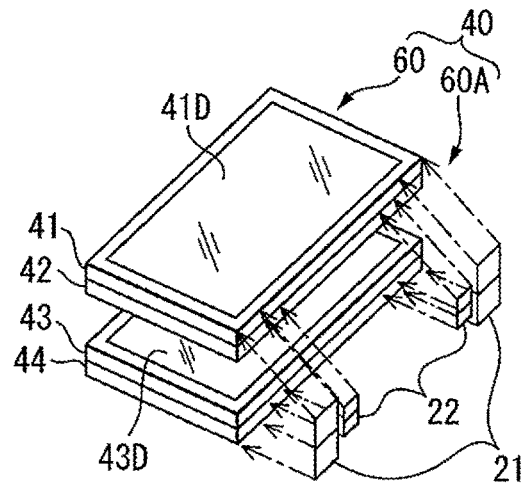
FIG. 5A is an assembled perspective view which illustrates the state which arranges the third and fourth housing sections of similar structures below the first and second housing sections which are illustrated in FIG. 4B with the display surface of the second housing section and the display surface of the third housing section superposed and connects them by second connecting devices of the present application to obtain an electronic device.
Figure 5B:
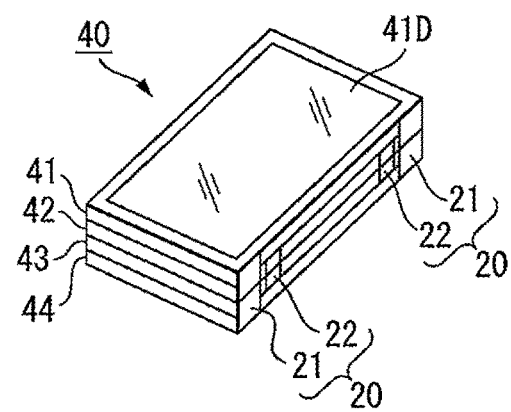
FIG. 5B is a perspective view after assembly of the electronic device which is illustrated in FIG. 5A.

Next, the case where the first to fourth housing sections 41 to 44 are connected by first and second connecting devices 10, 20 and form a display of four times the size after being spread open will be explained using FIG. 5A to FIG. 5G. First, an electronic device 60 which is provided with a first connecting device 10 of the first aspect and first and second housing sections 41, 42 which are superposed with their displays at the outsides and an electronic device 60A which is provided with third and fourth housing sections 43, 44 which are superposed with their displays at the outsides are prepared. Next, the display of the second housing section 42 of the electronic device 60 and the display 43D of the third housing section 43 of the electronic device 60A are superposed. Further, the end faces of the first and fourth housing sections 41, 44 adjoining the first connecting device are connected by the first hinges 21 while the end faces of the second and third housing sections 41, 43 at the same sides are connected by the second hinges 22 to form a single electronic device 40. FIG. 5B illustrates the state after assembly of the electronic device 40 which is illustrated in FIG. 5A.

The first hinges 21 enable the first housing section 41 and fourth housing section 44 to be opened in a V-shape about the hinge shafts of the first hinges 21. Further, the second hinges 22 enable the second housing section 42 and third housing section 43 to be opened in a V-shape about the hinge shafts of the second hinges 22 in the state where the first housing section 41 and fourth housing section 44 are moved to the outside of the second housing section 42 and the third housing section 43.

Figure 5C:
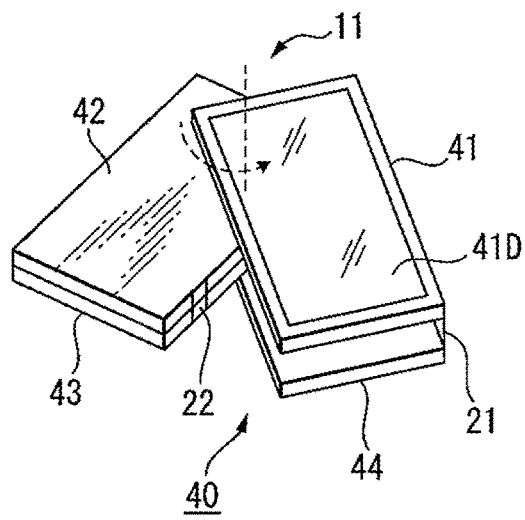
FIG. 5C is a perspective view which illustrates the state where the outside first and fourth two housing sections among the four housing sections which are illustrated in FIG. 5B start to be rotated with respect to the inside second and third two housing sections about first shafts of first connecting devices.
Figure 5D:
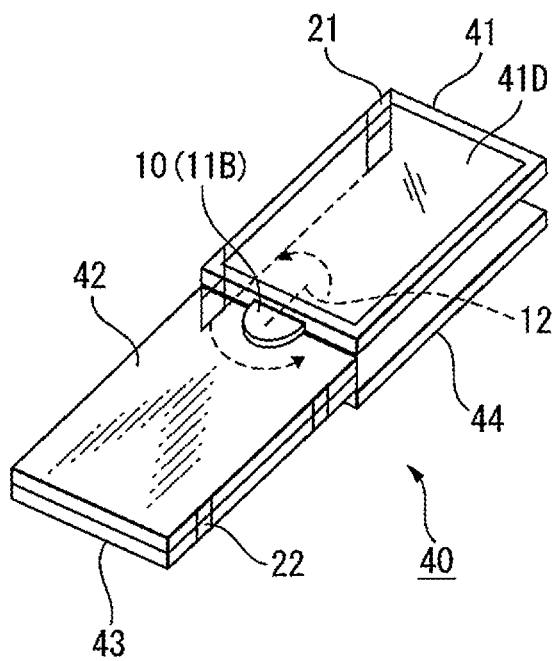
FIG. 5D is a perspective view which illustrates the state where the first and fourth housing sections which are illustrated in FIG. 5C are rotated with respect to the second and third housing sections by 180 degrees.

FIG. 5C illustrates the state where, among the four housing sections 41 to 44 of the electronic device 40 which is illustrated in FIG. 5B, the outside first and fourth housing sections 41, 44 start to be made to rotate with respect to the inside second and third housing sections 42, 43 about the first shafts 11 of the first connecting devices 10. Further, if making the first and fourth housing sections 41, 44 rotate with respect to the second and third housing sections 42, 43 about the first shafts 11 by 180 degrees, the result becomes the state which is illustrated in FIG. 5D. In this state, at the front side, a second semicircular shaft 11B is exposed on the second housing section 42, a first semicircular shaft 11A is in the first housing section 41, at the back side, a second semicircular shaft 11B is exposed on the third housing section 43, and a first semicircular shaft 11A is in the fourth housing section 44.

In the state which is illustrated in FIG. 5D, the end faces of the first and fourth housing sections 41, 44 where the hinges 21 are provided and the end faces of the second and third housing sections 42, 43 where the hinges 22 are provided are at different sides. Further, there is a second shaft 12 at the center of the end faces of the first and fourth housing sections 41, 44 where the hinges 21 are provided and the end faces with no hinges. Similarly, there is a second shaft 12 at the center of the end faces of the second and third housing sections 42, 43 where the hinges 22 are provided and the end faces with no hinges.

Figure 5E:
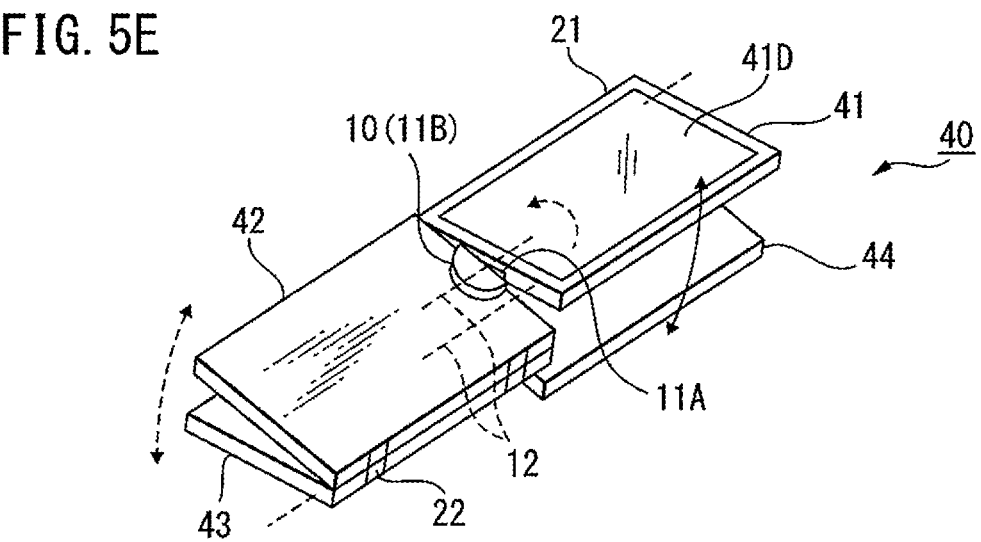
FIG. 5E is a perspective view which illustrates the state where the first and second housing sections and the third and fourth housing sections are rotated about second shafts of the first connecting devices and the first and fourth housing sections and the second and third housing sections start to be rotated about the hinge shafts of the second connecting devices from the state which is illustrated in FIG. 5D.
Figure 5F:
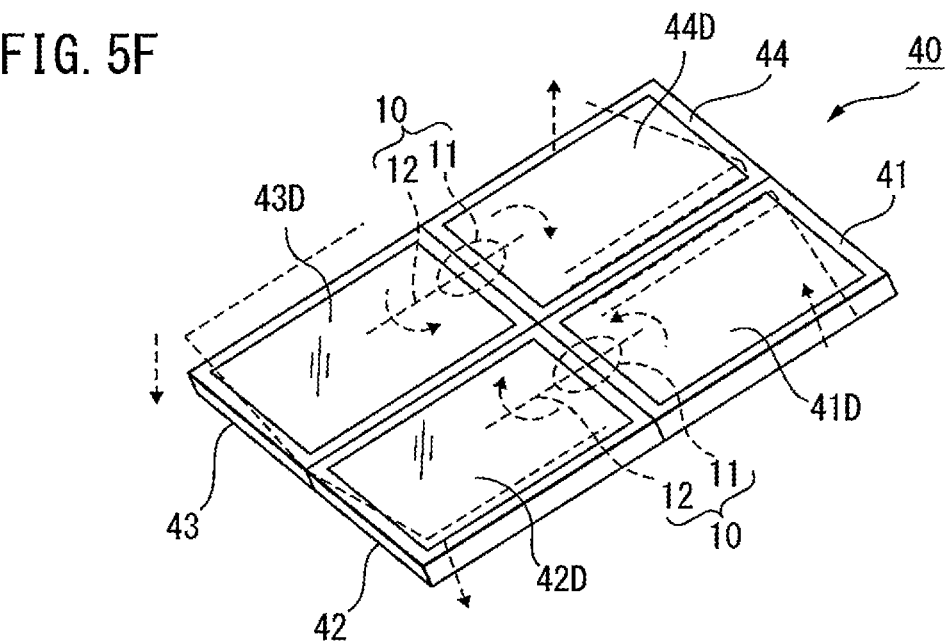
FIG. 5F is a perspective view which illustrates the state right before the first and second housing sections and the third and fourth housing sections are further rotated about the second shafts of the first connecting devices and the first and fourth housing sections and the second and third housing sections are further rotated and a single flat surface is formed from the state which is illustrated in FIG. 5E.

Therefore, in the state which is illustrated in FIG. 5D, the end parts of the first and fourth housing sections 41, 44 with no hinges 21 and the end parts of the second and third housing sections 42, 43 with no hinges 22 are spread open as illustrated in FIG. 5E in the arrow directions. The first and fourth housing sections 41, 44 and the second and third housing sections 42, 43 rotate about the second shafts 12 of the first connecting devices 10 and open about the hinges 21, 22 in a V-shape. If the first and fourth housing sections 41, 44 and the second and third housing sections 42, 43 are further spread open, after the state which is illustrated by the broken lines in FIG. 5F, the first and fourth housing sections 41, 44 and the second and third housing sections 42, 43 are rotated about the first connecting devices 10 by 180 degrees and become fully flat. This state is illustrated in FIG. 5G.

Figure 5G:
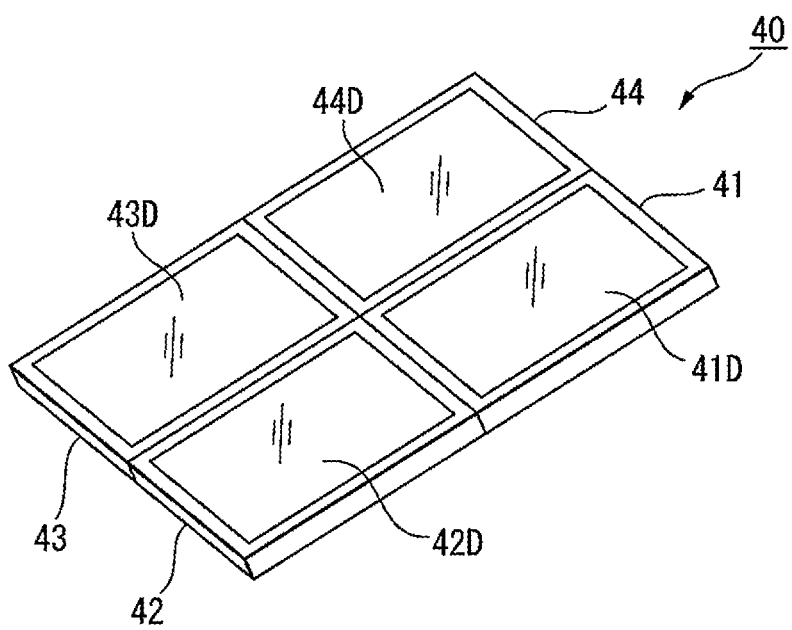
FIG. 5G is a perspective view which illustrates the state where the first and second housing sections and the third and fourth housing sections are rotated about the second shafts of the first connecting devices by 180 degrees and the first and fourth housing sections and the second and third housing sections are rotated about the hinge shafts of the second connecting devices by 180 degrees and a single flat surface is formed from the state which is illustrated in FIG. 5F.

In the full flat state, as illustrated in FIG. 5G, the displays 41D to 44D at all of the housing sections 41 to 44 adjoin each other and form a single screen. Further, the first connecting devices 10 and the second connecting devices 20 are both hidden at the superposed surfaces of the first to fourth housing sections 41 to 44, so are not exposed at the electronic device 40 in the full flat state.

The first connecting device 10 of the first aspect of the present application is provided with the second shaft 12 perpendicular to the first shaft 11. Next, the first connecting device 10 of a second aspect of the present application will be explained. The first connecting device 10 of the second aspect has the second shaft 12 not perpendicular to the first shaft 11, but twisted from it in position.

Figure 6A:
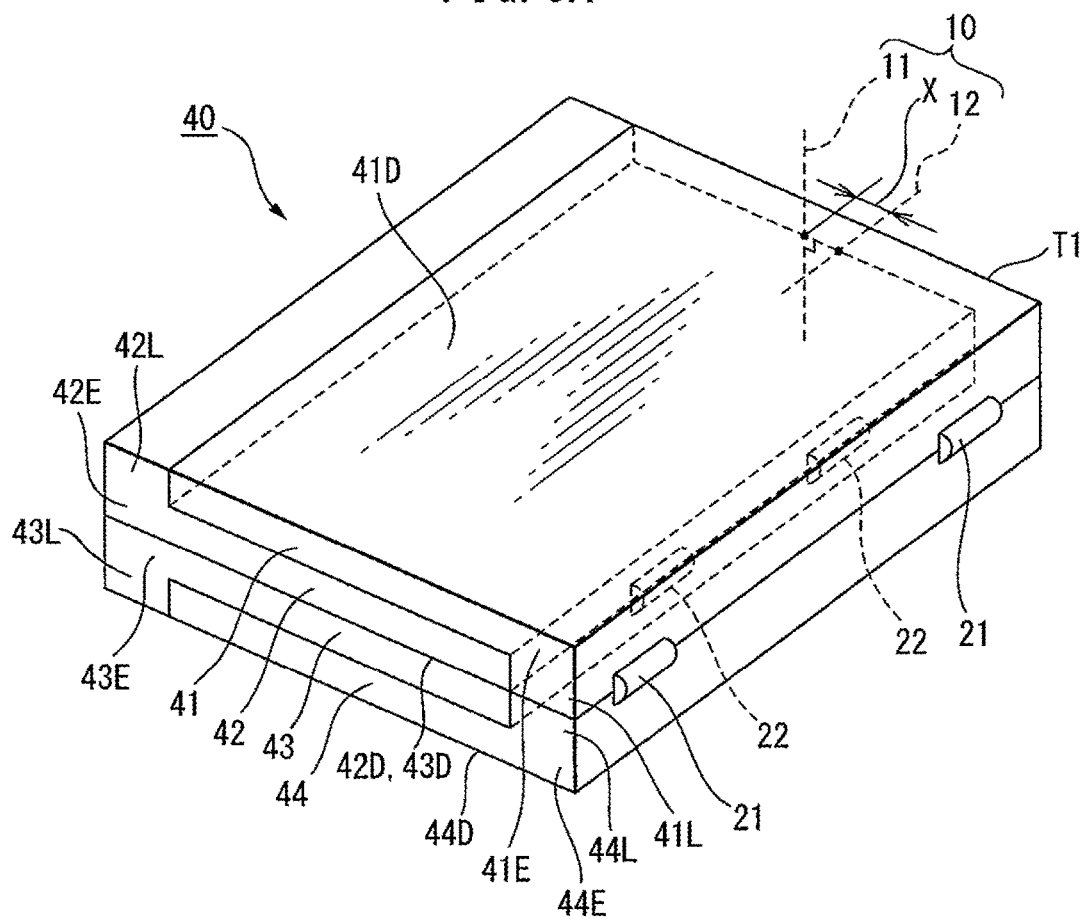
FIG. 6A is a perspective view which illustrates an electronic device which is provided with four housing sections which are connected by first connecting devices and second connecting devices of a second aspect of the present application.
Figure 6B:
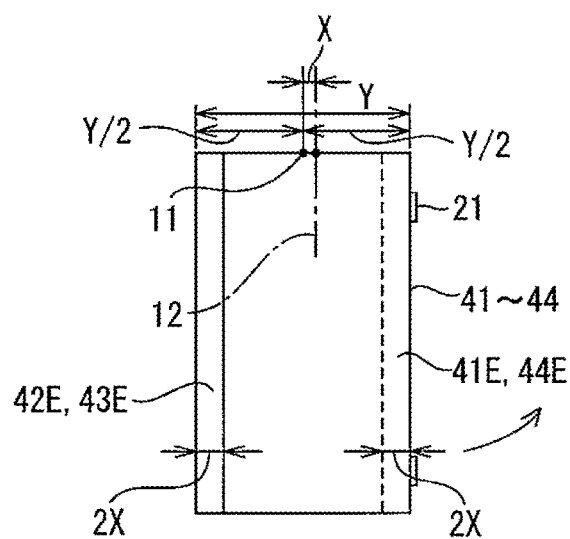
FIG. 6B is a plan view of an electronic device which is provided with the four housing sections which are illustrated in FIG. 6A and explains the relationship of the line of a normal from a first shaft to a second shaft of a first connecting device and the size of the widths of extended parts which are provided at single end faces of the housing sections.

FIG. 6A illustrates an electronic device 40 where third and fourth housing sections 43, 44 of similar structures are superposed under the first and second housing sections 41, 42 which are connected by the first connecting device 10 of the second aspect of the present application. In the electronic device 40, the displays 41D, 44D of the first and fourth housing sections are exposed to the outside, while the display 42D of the second housing section 42 and the display 43D of the third housing section are superposed. Further, the second shaft 12 of the first connecting device 10 is at a position twisted from the first shaft 11. The length of the normal which descends from the first shaft 11 to the second shaft 12 is X.

In this case, when using the first connecting devices 10 of the second aspect to connect the end faces T1 of the first and second housing sections 41, 42 and the third and fourth housing sections 43, 44, the end parts of the housing sections 41 to 44 are provided with extended parts 41E to 44E so that after being spread open, the screens form a continuous flat surface. The extended parts 41E, 44E extend at the sides where the second connecting devices 20 are attached, while the extended parts 42E, 43E extend to the opposite sides. Further, the extended part 41E is provided with leg parts 41L, 44L which are provided with heights reaching the superposed surfaces of the second and third housing sections 42, 43 at the back surface side of the extended part 42E. In the same way, the extended part 42E is provided with leg parts 42L, 43L which are provided with heights reaching the displays 41D, 44D of the first and fourth housing sections 41, 44 at the back surface side of the extended part 42E.

Figure 6C:
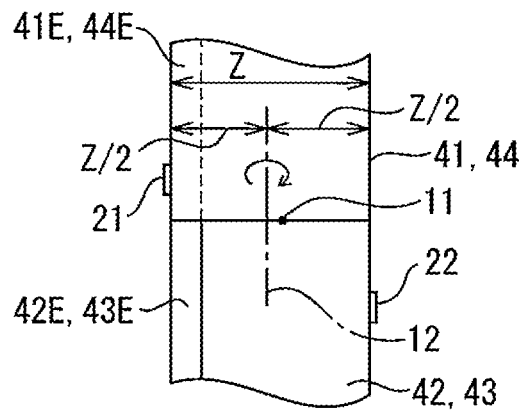
FIG. 6C is a plan view of the first to fourth housing sections after the four housing sections which are illustrated in FIG. 6B are rotated by the first shafts of the first connecting devices by 180 degrees.

The extended lengths of the extended parts 41E to 44E are made 2X when the first shafts 11 are at center point positions of the distance Y between the extended parts 41E, 44E and the extended parts and the length of the normal descending from the first shafts 11 to the second shafts 12 is X. This is because if the length of the normal descending from the first shafts 11 to the second shafts 12 is X, if rotating the first to fourth housing sections 41, 44 about the first shafts 11 in the arrow mark direction by 180 degrees, the positions of the second shafts 12 will gradually deviate from the original position by 2X. Further, if making the extended lengths of the extended parts 41E, 42E the lengths of 2X, as illustrated in FIG. 6C, when making the first and fourth housing sections 41, 44 rotate about the first shafts 11 by 180 degrees, the second shafts 12 becomes positions bisecting the width Z of the housing sections in that state. Therefore, in this state, even if making the second housing section 42 rotate about the second shaft 12 as illustrated by the arrow by 180 degrees, no step difference arises between the end faces of the first and second housing sections 41, 42 and the end faces of the third and fourth housing sections 43, 44.

Further, the first hinges 21 of the second connecting devices 20 are attached between the extended parts 41E, 44E, while the second hinges 22 are attached at the end faces of the housing sections 42, 43 at the opposite sides to the extended parts 42E, 43E. Due to this structure, if opening the first and fourth housing sections 41, 44 which are illustrated in FIG. 6C about the first hinges 21 as the center of rotation into a V-shape and opening the second and third housing sections 42, 43 about the second hinges 22 as the center of rotation, the displays of the first to fourth housing sections 41 to 44 become flat.

Figure 6D:
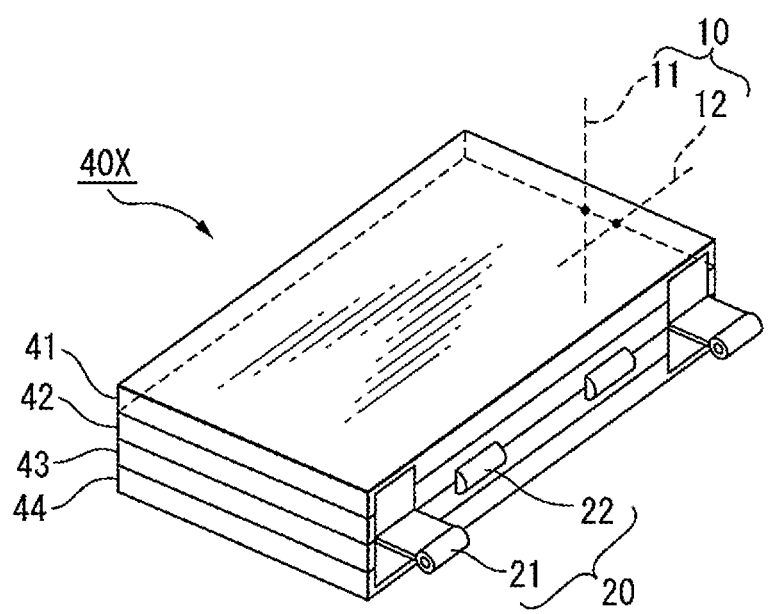
FIG. 6D is a perspective view which illustrates an electronic device of a comparative example which is provided with four housing sections which are connected by first connecting devices and second connecting devices of the second aspect of the present application and do not have extended parts.

Here, the electronic device 40X of a comparative example in the case where the extended parts 41E to 44E are not provided will be explained using FIG. 6D to FIG. 6F. FIG. 6D illustrates an electronic device 40X comprised of first and second housing sections 41, 42 which are connected by the first connecting device 10 of the second aspect and do not have extended parts and, under them, third and fourth housing sections 43, 44 of similar structures with the display of the second housing section and the display of the third housing section superposed. The first connecting device 10 has a first shaft 11 and a second shaft 12. The two are at twisted positions. This point is the same as with the electronic device 40 which is illustrated in FIG. 6A. The first hinges 21 of the second connecting devices 20 are attached between the first and fourth housing sections 41, 44, while the second hinges 22 are attached between the second and third housing sections 42, 43.

Figure 6E:
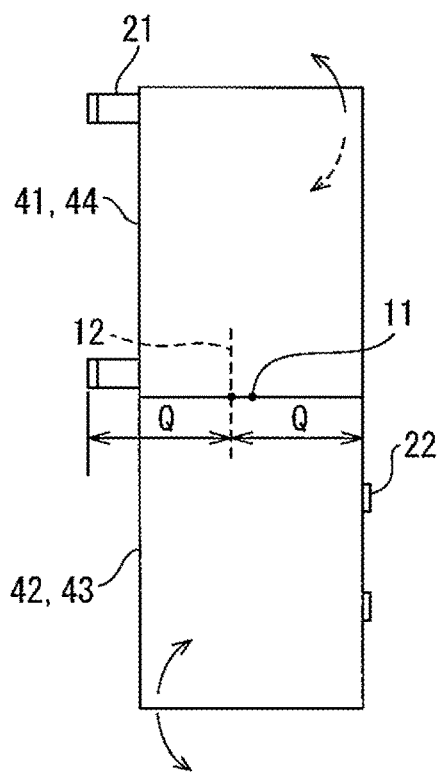
FIG. 6E is a plan view of the first to fourth housing sections in the four housing sections which are illustrated in FIG. 6D after the first and fourth housing sections are rotated with respect to the second and third housing sections by the first shafts of the first connecting devices by 180 degrees.

FIG. 6E illustrates the four housing sections 41 to 44 which are illustrated in FIG. 6D after the first and fourth housing sections 41, 44 in the four housing sections 41 to 44 are rotated with respect to the second and third housing sections 42, 43 by the first shafts 11 of the first connecting devices 10 by 180 degrees. While illustrated also in FIG. 6D, the first hinges 21 have lengths from the second shafts 12 to the first hinges 21 and second hinges 22 made the same length Q, so the hinge shafts are at positions separated from the end faces of the first and fourth housing sections 41, 44.

Figure 6F:
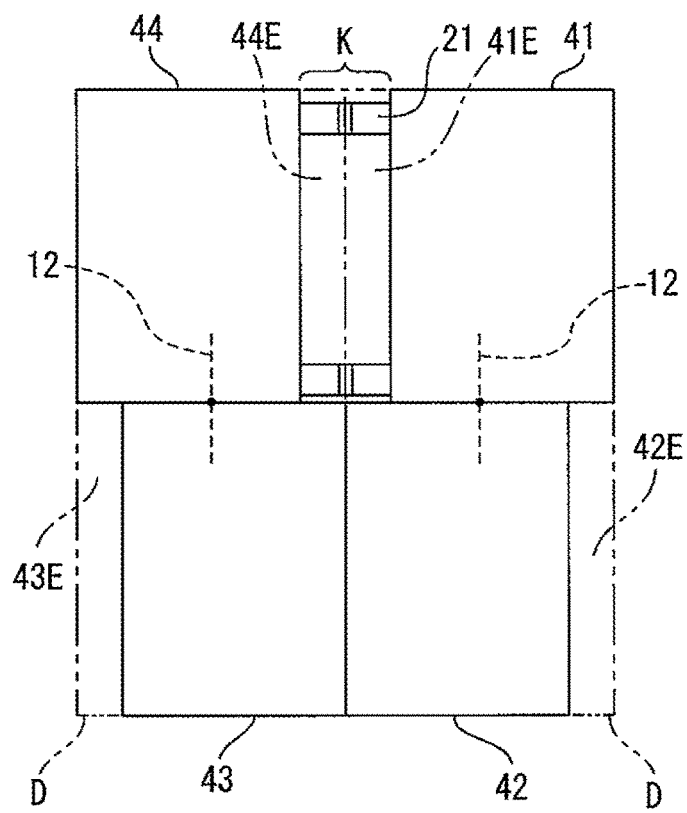
FIG. 6F is a plan view of the first to fourth housing sections when the four housing sections which are illustrated in FIG. 6E are spread open by the second shafts of the first connecting devices and the hinges of the second connecting devices.

FIG. 6F illustrates the first to fourth housing sections 41 to 44 when the four housing sections 41 to 44 which are illustrated in FIG. 6E are spread open by the second shafts 12 of the first connecting devices 10 and the first and second hinges 21, 22 of the second connecting devices 20. If in this way the end faces of the first to fourth housing sections 41 to 44 are not provided with the extended parts 41E to 44E, if spreading open the first to fourth housing sections 41 to 44 using the first and second connecting devices 10, 20, a clearance part K and step differences D end up forming at the display. The extended parts 41E to 44E which are illustrated in FIG. 6F by the two-dot chain lines are for filling in these clearance part K or step differences D to form a single continuous large screen.

Figure 7A:
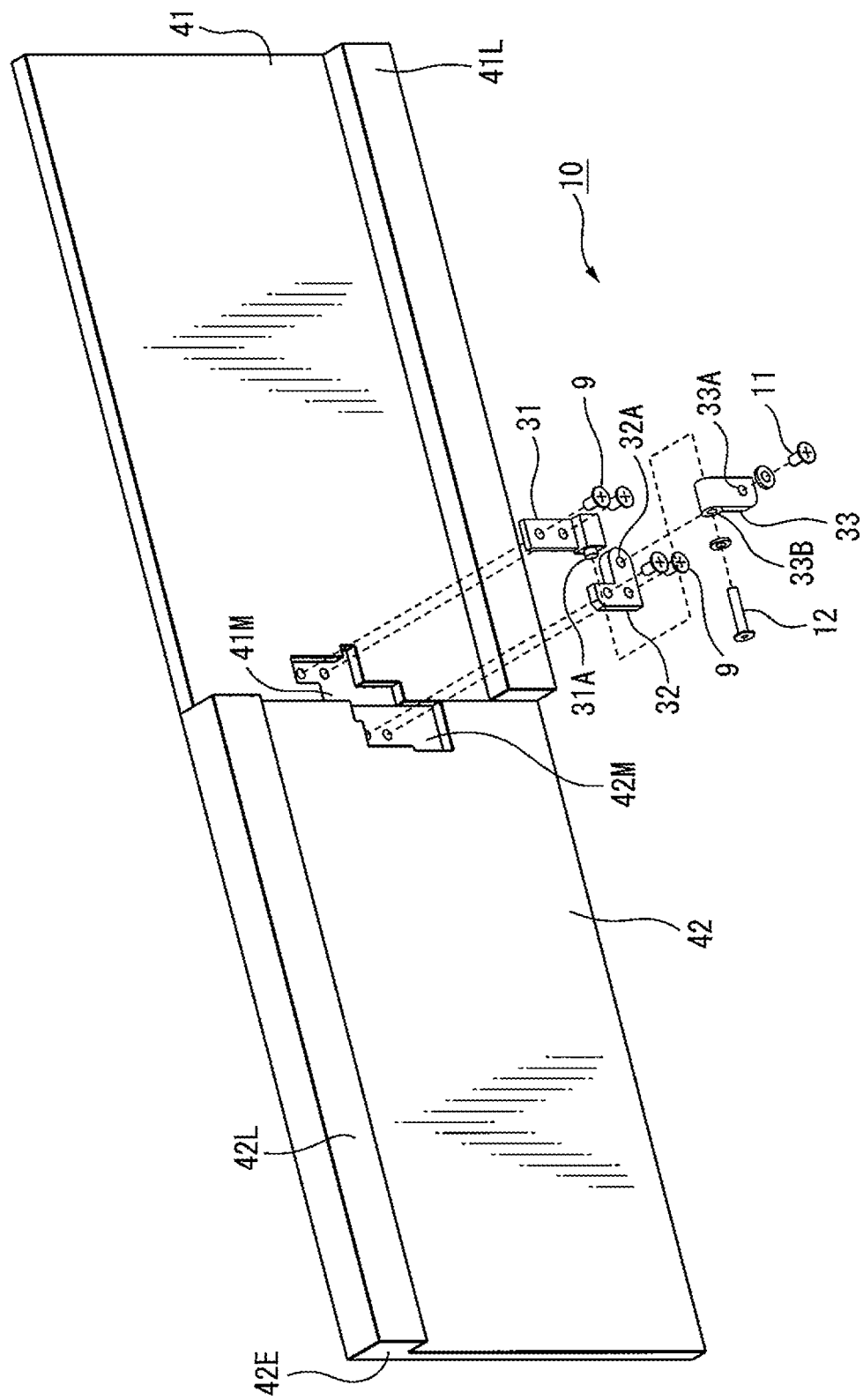
FIG. 7A is an assembled perspective view which illustrates the structure of a specific example of a first connecting device of the second aspect of the present application.

FIG. 7A is an assembled perspective view which illustrates the structure of a specific example of the first connecting device 10 of the second aspect of the present application. FIG. 7A illustrates the first connecting device 10 which is attached between the first and second housing sections 41, 42. The first connecting device which is attached between the third and fourth housing sections 43, 44 has a shape in a mirror image relationship with the first connecting device 10 which is illustrated in FIG. 7A. The component members are completely the same, so illustration and explanation will be omitted. The first connecting device 10 of the present embodiment is provided with a first fastening plate 31 and second fastening plate 31 for attaching the first shaft 11 and the second shaft 12 to the first and second housing sections 41, 42 and with a moving member 33.

The first fastening plate 31 is attached by screws 9 to the recessed part 41M which is provided at the end part of the first housing section 41. The first fastening plate 31 is provided with a hole 31A for attaching the second shaft 12. The second fastening plate 32 is attached by screws 9 to the recessed part 42M which is provided at the end part of the second housing section 42. The second fastening plate 32 is provided with a hole 32A for inserting the first shaft 11. The moving member 33 is provided with a hole 33A for inserting the first shaft 11 and a hole 33B for inserting the second shaft 12. The hole 33A and the hole 33B are at twisted positions. The first shaft 11 is inserted into the hole 33A of the moving member 33, then is attached to the hole 32A of the second fastening plate 32. The second shaft 12 is inserted into the hole 33B, then is attached to the hole 31A of the first fastening plate 31.

Figure 7B:
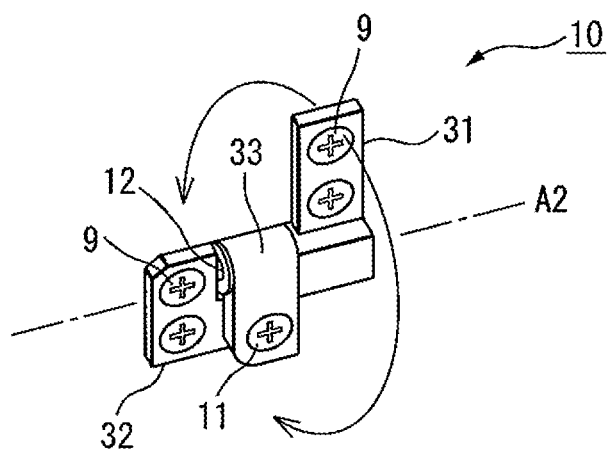
FIG. 7B is a perspective view of a first connecting device which illustrates the assembled state of the first connecting device of the second aspect which is illustrated in FIG. 7A.
Figure 7C:
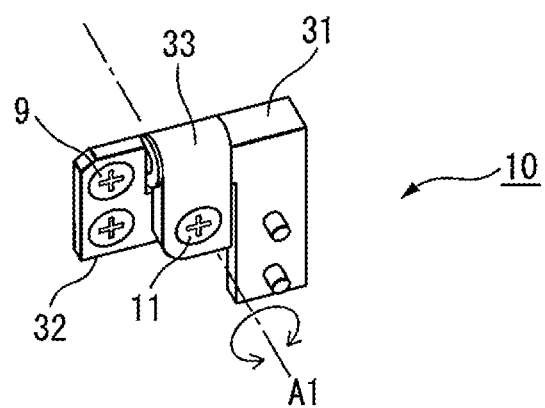
FIG. 7C is a perspective view which illustrates the state where a first fastening plate is rotated by 180 degrees with respect to a second fastening plate of the first connecting device of the second aspect which is illustrated in FIG. 7B.

FIG. 7B illustrates the assembled state of the first connecting device 10 of the second aspect which is illustrated in FIG. 7A. Further, FIG. 7C illustrates the state where the first fastening plate 31 is rotated with respect to the second fastening plate 32 of the first connecting device 10 of the second aspect which is illustrated in FIG. 7B about the second shaft 12 by 180 degrees. Further, in the state which is illustrated in FIG. 7C, the first fastening plate 31 can be rotated about the first shaft 11 by 180 degrees.

Here, the process by which the electronic device 60 which is provided with the first and second housing sections 41, 42 is changed from the open state to the superposed state by the first connecting device 10 which is attached between the first and second housing sections 41, 42 will be explained using FIG. 8A to FIG. 8I.

Figure 8B:
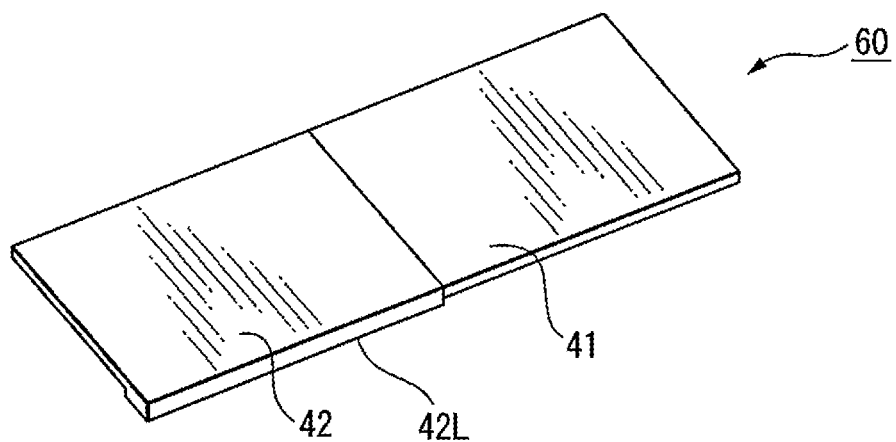
FIG. 8B is a perspective view of display surface sides of the first and second housing sections which are illustrated in FIG. 8A.

FIG. 8A illustrates the state where the first and second housing sections 41, 42 of the electronic device 60 are spread open by the first connecting device 10 of the second aspect which is illustrated in FIG. 7B as seen from the back side of the display. Further, FIG. 8B illustrates the first and second housing sections 41, 42 of the electronic device 60 which is illustrated in FIG. 8A as seen from the display side. Reference notation 42E indicates an extended part, while 41L and 42L indicate leg parts.

Figure 8D:
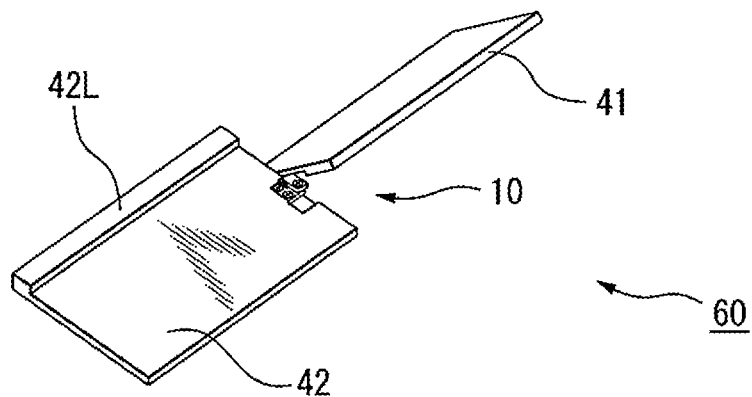
FIG. 8D is a perspective view which illustrates the state where the first housing section is further rotated with respect to the second housing section from the state of FIG. 8C.
Figure 8E:
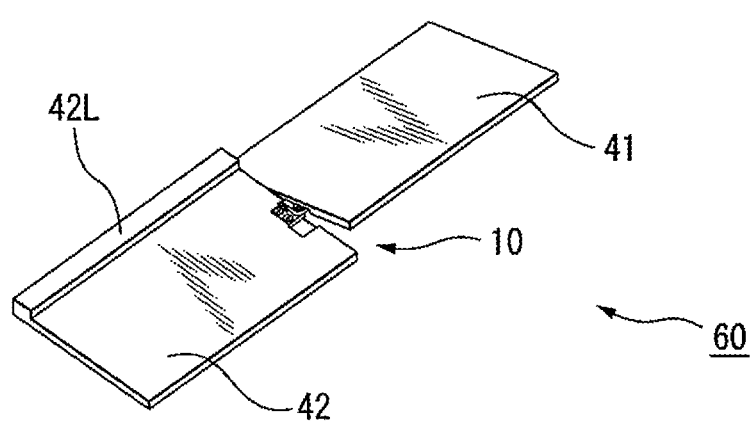
FIG. 8E is a perspective view which illustrates the state where the first housing section is further rotated with respect to the second housing section from the state of FIG. 8D.
Figure 8F:
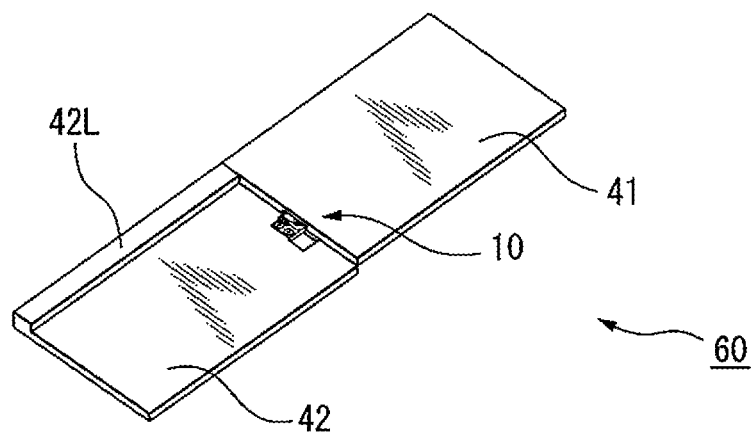
FIG. 8F is a perspective view which illustrates the state where the first housing section is rotated with respect to the second housing section using the first connecting device of the second aspect by 180 degrees from the state of FIG. 8E.

FIG. 8C illustrates the state where the first housing section 41 is started to be rotated with respect to the second housing section 42 about the second shaft 12 of the first connecting device 10 from the state which is illustrated in FIG. 8A. Further, FIG. 8D, FIG. 8E, and FIG. 8F illustrate the state where the first housing section 41 is further rotated with respect to the second housing section 42 from the state which is illustrated in FIG. 8C. Further, if the first housing section 41 is rotated with respect to the second housing section 42 about the second shaft 12 by 180 degrees from the state which is illustrated in FIG. 8E, the result becomes the state which is illustrated in FIG. 8F. The first housing section 41 does not rotate any further with respect to the second housing section 42.

Figure 8G:
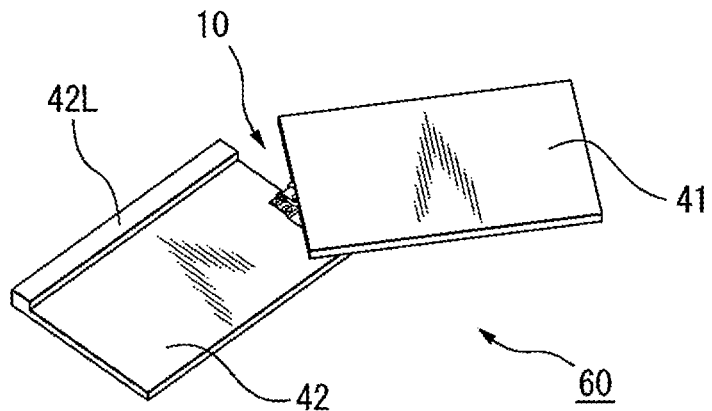
FIG. 8G is a perspective view which illustrates the state where the first housing section starts to be rotated about the first shaft of the first connecting device of the second aspect from the state which is illustrated in FIG. 8F.
Figure 8H:
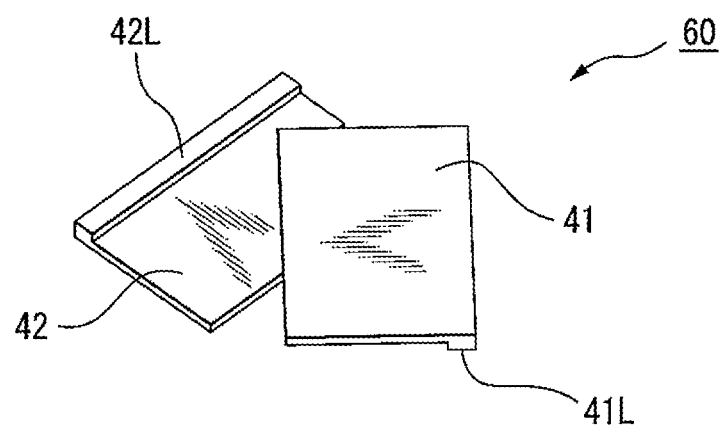
FIG. 8H is a perspective view which illustrates the state where the first housing section is further rotated with respect to the second housing section from the state of FIG. 8G.
Figure 8I:
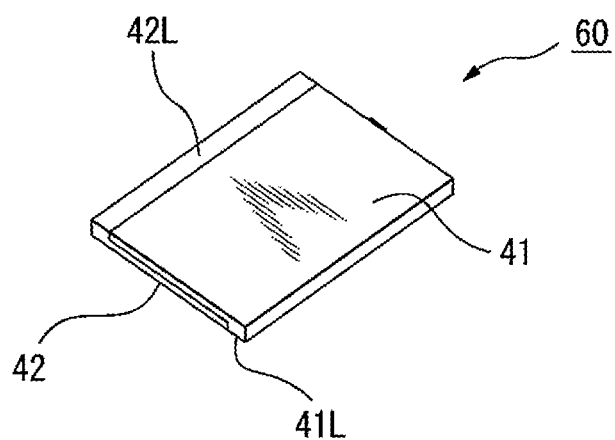
FIG. 8I is a perspective view which illustrates the state where the first housing section is rotated with respect to the second housing section by 180 degrees and is superposed using the first connecting device of the second aspect from the state of FIG. 8H.

In the state which is illustrated in FIG. 8F, this time the first housing section 41 can rotate with respect to the second housing section 42 about the first shaft 11. FIG. 8G illustrates the state where the first housing section 41 starts to rotate about the first shaft 11 of the first connecting device 10 from the state which is illustrated in FIG. 8F, while FIG. 8H illustrates the state where the first housing section 41 rotates further with respect to the second housing section 42 from the state which is illustrated in FIG. 8G. If, in this way, the first housing section 41 rotates with respect to the second housing section 42 about the first shaft 11 and the angle of rotation becomes 180 degrees, as illustrated in FIG. 8I, the first housing section 41 is superposed on the second housing section 42. In the superposed state, the electronic device 60 becomes a box shape due to the leg parts 41L, 42L.

In the case of forming the electronic device 40 which is provided with the first to fourth housing sections 41 to 44 such as illustrated in FIG. 6A, two electronic devices 60 which are provided with such a structure are prepared and the two housing sections at the second electronic device 60 are made the third and fourth housing sections 43, 44. However, the first connecting device of the third and fourth housing sections 43, 44 is in a mirror relationship with the first connecting device of the first and fourth housing sections 41, 44. Further, below the second housing section 42, a third housing section 43 is arranged. If connecting the end faces of the first and fourth housing sections 41, 44 by the first hinges 21 and connecting the end faces of the second and third housing sections 42, 43 by the second hinges 22, it is possible to produce an electronic device 40 such as illustrated in FIG. 6A.

Figure 9:
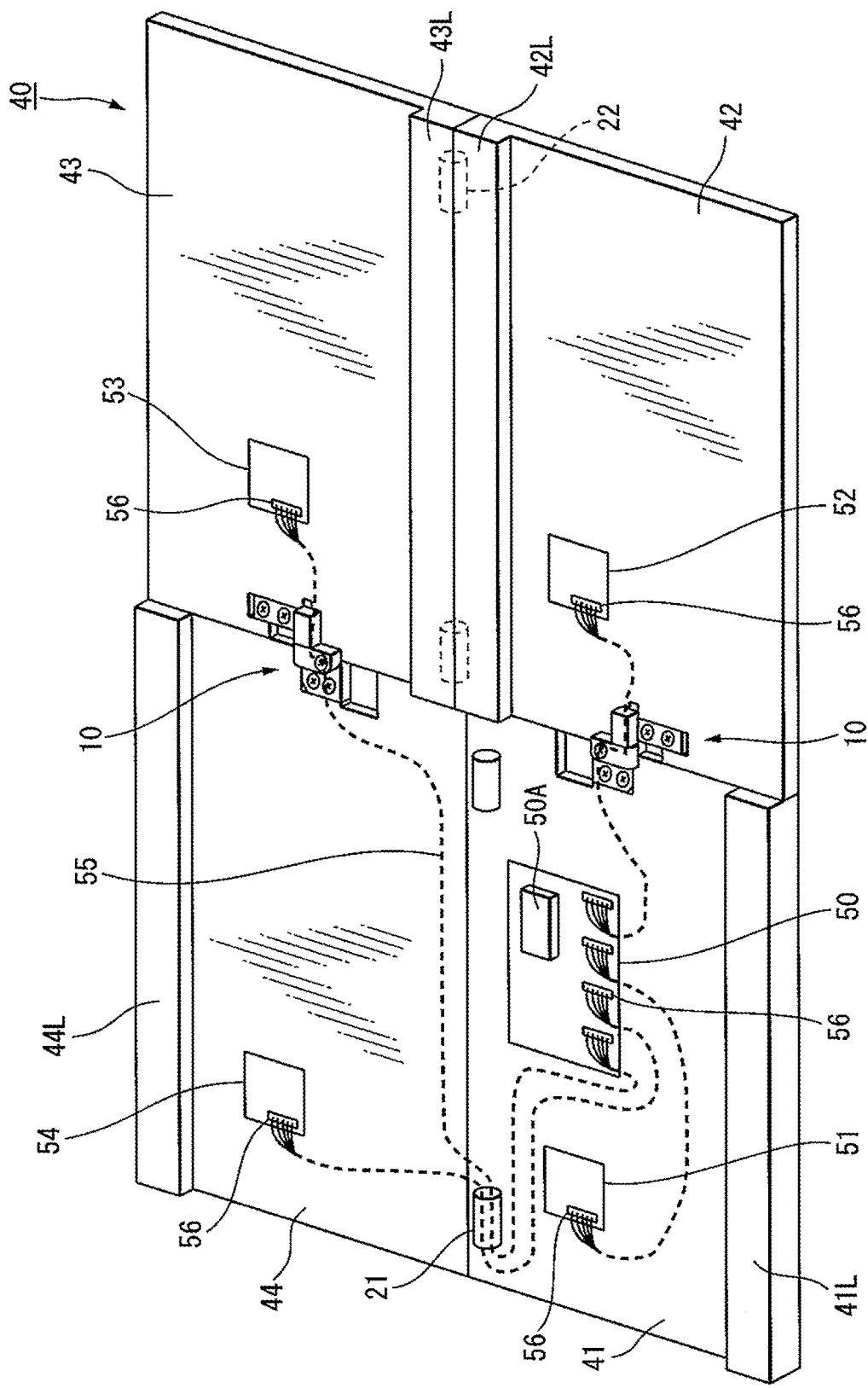
FIG. 9 is a perspective view which explains an embodiment of the structure of the back surface side when the electronic device which is illustrated in FIG. 6A which was connected by the first connecting devices of the second aspect which is illustrated in FIG. 7A and the four display surfaces are arranged adjoining each other.

FIG. 9 illustrates one embodiment of the structure of the back surface side when the electronic device 40 which is illustrated in FIG. 6A in which the first connecting device 10 of the specific embodiment which is explained in FIG. 7A is spread open and the four displays are arranged adjoining each other. The first and second housing sections 41, 42 and the third and fourth housing sections 43, 44 are connected by first connecting devices 10. The two first connecting devices 10 are in a mirror image relationship. Further, the first and fourth housing sections 41, 44 are connected by the first hinges 21, while the second and third housing sections 42, 43 are connected by the second hinges 22.

In the present embodiment, the back surface of the first housing section 41 is provided with a main board 50 on which a CPU 50A is mounted as a control device and which controls the electronic device 40 as a whole. The back surfaces of the housing sections 41 to 44 are provided with display-use circuit boards 51 to 54. These control the display of the display parts. The main board 50 and the display-use circuit boards 51 to 54 are connected by fine cable bundles 55. The two end parts of the fine cable bundles 55 are provided with connection-use connectors 56 attached to them. The control device can work together with the display-use circuit boards 51 to 54 to display an image of a quarter of a screen's worth of a single display image in synchronization with the other screens.

The fine cable bundle 55 which connects the main board 50 and the first display-use circuit board 51 is directly connected, but the fine cable bundle 44 which connects the main board 50 and the second display-use circuit board 52 is arranged passing through the first connecting device 10. Further, the fine cable bundle 44 which connects the main board 50 and the third display-use circuit board 53 is arranged passing through the first hinge 21 and passing through the first connecting device 10. Furthermore, the fine cable bundle 44 which connects the main board 50 and the fourth display-use circuit board 54 is arranged through the first hinge 21. Due to this structure, it becomes possible to display a large image on a single screen of the electronic device 40.

Figure 10A:
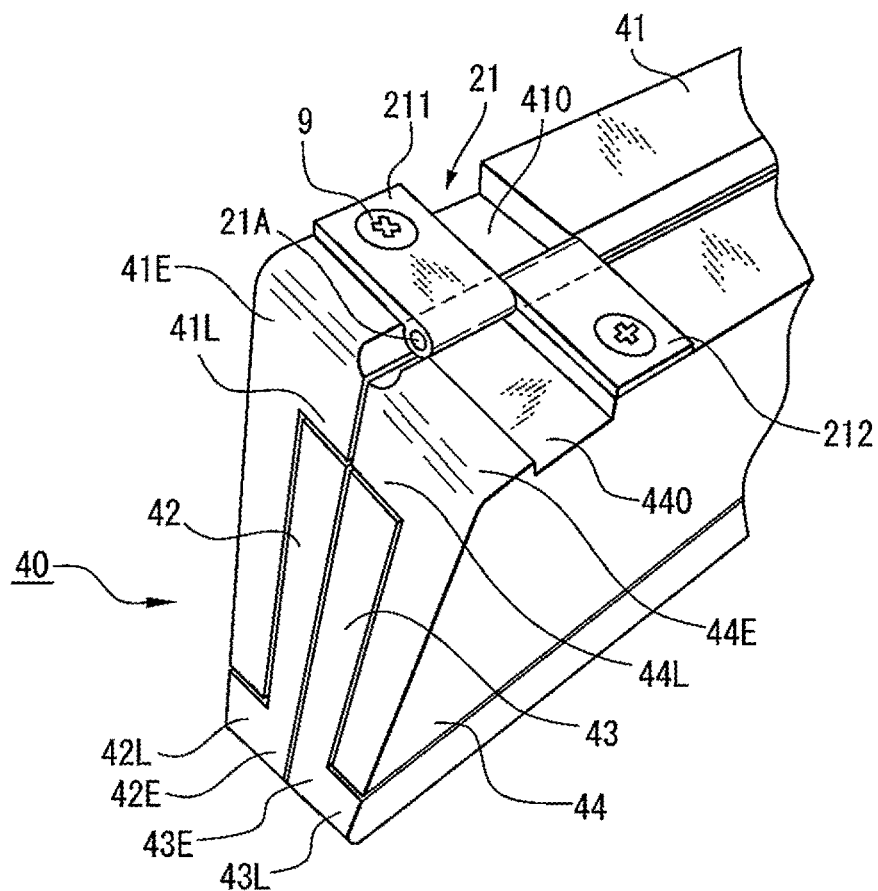
FIG. 10A is a perspective view which illustrates one embodiment of a first hinge which is illustrated in FIG. 6A.

FIG. 10A illustrates the structure of one embodiment of the first hinge 21 which is provided spanning the leg part 41L of the first housing section 41 and the leg part 44L of the fourth housing section 44. The first hinge 21 of the present embodiment is provided with a wing piece 211 which is fastened to the first housing section 41 by screws 9 and a wing piece 212 which is fastened to the fourth housing section 44 by screws 9. The end parts which are not fastened by screws 9 are arranged adjoining each other and are connected by a shaft 21A. The leg parts 41L, 44L of the first and fourth housing sections 41, 44 are provided with recessed parts 410, 440. The recessed parts 410, 440 receive the wing pieces 211, 212 when the first and fourth housing sections 41, 44 rotate about the shaft 21A by 180 degrees and the leg parts 41L, 44L and extended parts 41E, 44E are superposed. The structure of the first hinge 21 is not limited to this embodiment.

Figure 10B:
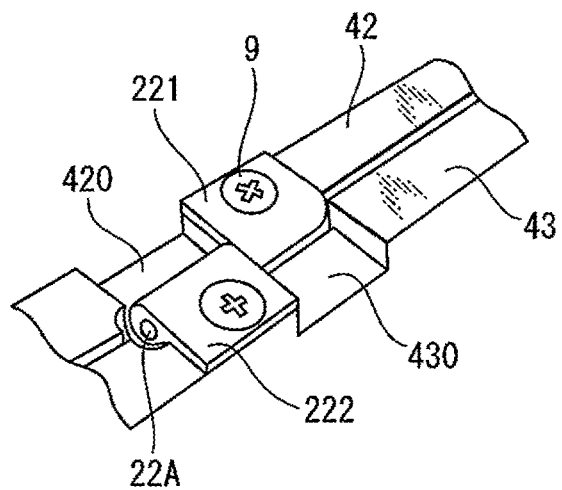
FIG. 10B is a perspective view which illustrates one embodiment of a second hinge which is illustrated in FIG. 6A.

FIG. 10B illustrates the structure of one embodiment of a second hinge 22 which is provided straddling the end face of the second housing section 42 and the end face of the third housing section 43. The second hinge 22 of the present embodiment is provided with a wing piece 221 which is fastened to the second housing section 42 by screws 9 and a wing piece 222 which is fastened to the third housing section 43 by screws 9. The end parts which are not fastened by screws 9 are arranged adjoining each other and are connected by a shaft 22A. The end faces of the second and third housing sections 42, 43 are provided with recessed parts 420, 430 which receive the wing pieces 221, 222 when the second and third housing sections 42, 43 are rotated about the shaft 22A by 180 degrees and the end faces are superposed. The structure of the second hinge 22 is not limited to this embodiment.

As explained above, the electronic device 40 which is provided with a connecting system of a multi-section housing of the present application can form a full flat large screen in the state with the plurality of housing sections provided with screens connected together and can be rendered a shape convenient for carrying by superposing the housing sections by a rotate operation by two axes. Further, the first connecting device can be configured from a combination of two shafts and parts rotating and holding the same, so manufacture is easy.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A connecting system of a multi-section housing having a first connecting device which is provided at a center part of single end faces of first and second housing sections of the same dimensions which are superposed with display surfaces at the outsides, the first connecting device comprising:
   a first shaft which is provided in a direction vertical to superposed surfaces of the first and second housing sections; and
   a second shaft which is provided in a direction perpendicular to the first shaft; wherein
   when a center line of the first shaft is arranged on a line bisecting the end faces to the left and right, and a center line of the second shaft is arranged on the superposed surfaces of the first and second housing sections, by making the second housing section which is superposed below the first housing section rotate by the first shaft by 180 degrees and in this state making the first housing section rotate by the second shaft by 180 degrees, the display surfaces of the first and second housing sections can be formed on the same plane.

2. The connecting system of a multi-section housing according to claim 1, wherein
   the first shaft is a columnar shaped shaft which is bisected at a diametrical position of the circle into a first semicircular shaft and a second semicircular shaft,
   the second shaft is provided at the split surfaces of the first semicircular shaft and the second semicircular shaft so as to enable rotation of the first semicircular shaft by 180 degrees,
   one end of the second semicircular shaft is buried in the second housing section so that the split surfaces become the same plane as the single end faces, and
   the other end of the second semicircular shaft sticks out from the superposed surfaces and is fit into a groove which is provided at the superposed surfaces of the first housing section when the first and second housing sections are superposed.

3. The connecting system of a multi-section housing according to claim 2, wherein
   the outer circumferential surface of the first shaft at the side which is fit into the first housing section is provided with a ridge over the entire circumference so that the first housing section does not detach from the first shaft.

4. The connecting system of a multi-section housing according to claim 1, further comprising:
   third and fourth housing sections connected by the first connecting device in the same way as the first and second housing sections are connected and are superposed under the second housing section in that order; and
   second connecting devices which are arranged between the first and fourth housing sections and between the second and third housing sections, wherein
   the second connecting devices are provided with first hinges which connect single end faces of the first and fourth housing sections and second hinges which connect end faces of the second and third housing sections at opposite sides to the end faces at the first hinge sides, and
   the first shafts are used to make the second and third housing sections rotate with respect to the first and fourth housing sections by 180 degrees and, in the finished rotation state, the second shafts are used to make the first and fourth housing sections rotate with respect to the second and third housing sections while the second connecting devices are used to make end faces of the first and fourth housing sections and end faces of the second and third housing sections approach each other, and, when rotation of the first and fourth housing sections with respect to the second and third housing sections ends, end faces of the first and fourth housing sections and end faces of the second and third housing sections abut whereby a single flat surface is formed.

5. The connecting system of a multi-section housing according to claim 1, further comprising:
   third and fourth housing sections connected by the first connecting device in the same way as the first and second housing sections are connected and are superposed under the second housing section in that order; and
   second connecting devices which are arranged between the first and fourth housing sections and between the second and third housing sections, wherein
   the second connecting devices are provided with first hinges which connect single end faces of the first and fourth housing sections and second hinges which connect end faces of the second and third housing sections at opposite sides to the end faces at the first hinge sides, and
   the first shafts are used to make the second and third housing sections rotate with respect to the first and fourth housing sections by 180 degrees and, in the finished rotation state, the second shafts are used to make the first and fourth housing sections rotate with respect to the second and third housing sections while the second connecting devices are used to make end faces of the first and fourth housing sections and end faces of the second and third housing sections approach each other, and, when rotation of the first and fourth housing sections with respect to the second and third housing sections ends, end faces of the first and fourth housing sections and end faces of the second and third housing sections abut whereby a single flat surface is formed.

6. The connecting system of a multi-section housing according to claim 5, wherein the length of a normal descended from the first shaft to the second shaft is defined as X, so that
   end faces of the first and fourth housing sections at the same sides of the first shafts and the second shafts are extended parallel to the second shafts by exactly the length 2X to the outside whereby first extended parts are provided, end faces of the second and third housing sections at the opposite sides of the first shafts and the second shafts are extended parallel to the second shafts by exactly the length 2X to the outside whereby second extended parts are provided, and end faces of the first extended parts and end faces of the second extended parts are formed to be on the same plane when the second and third housing sections are rotated by the first shafts by 180 degrees.

7. The connecting system of a multi-section housing according to claim 6, wherein the flat surface is comprised of display surfaces of an image, the first extended parts are provided with leg parts with end faces which form the same plane as the display surface of the second housing section when the first and second housing sections are superposed and leg parts with end faces which form the same plane as the display surface of the third housing section when the third and fourth housing sections are superposed, and the second extended parts are provided with leg parts with end faces which form the same plane as the display surface of the first housing section when the first and second housing sections are superposed and leg parts with end faces which form the same plane as the display surface of the fourth housing section when the third and fourth housing sections are superposed.

* * * * *